United States Patent
Jiang et al.

(10) Patent No.: US 12,526,174 B2
(45) Date of Patent: Jan. 13, 2026

(54) SPECTRUM SHAPING AND SUBBAND SPECTRUM SHAPING FOR TIGHT SPECTRUM CONFINEMENT AND TRANSCEIVER STRUCTURE

(71) Applicant: QUALCOMM Incorporated, San Diego, CA (US)

(72) Inventors: Jing Jiang, San Diego, CA (US);
Seyedkianoush Hosseini, San Diego, CA (US); Lei Xiao, San Jose, CA (US);
Vinayak Suresh, San Diego, CA (US);
Jae Won Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/193,564

(22) Filed: Mar. 30, 2023

(65) Prior Publication Data
US 2024/0333561 A1    Oct. 3, 2024

(51) Int. Cl.
*H04L 25/03*    (2006.01)
*H04W 72/0453*    (2023.01)
*H04W 72/20*    (2023.01)

(52) U.S. Cl.
CPC ... *H04L 25/03828* (2013.01); *H04W 72/0453* (2013.01); *H04W 72/20* (2023.01)

(58) Field of Classification Search
CPC ............ H04L 25/03828; H04L 5/0007; H04L 25/03821; H04L 27/26265; H04L 27/26412; H04L 27/26414; H04L 27/26536; H04L 27/26538; H04L 25/03834; H04W 72/0453; H04W 72/20
See application file for complete search history.

(56) References Cited

U.S. PATENT DOCUMENTS

| | | | |
|---|---|---|---|
| 7,027,942 B1 * | 4/2006 | Woodard | G01R 23/165 |
| | | | 324/76.19 |
| 2017/0279579 A1 * | 9/2017 | Qian | H04W 72/20 |
| 2017/0331647 A1 * | 11/2017 | Abdelghaffar | H04L 25/03006 |

(Continued)

OTHER PUBLICATIONS

International Search Report and Written Opinion—PCT/US2024/015378—ISA/EPO—Jun. 14, 2024.

(Continued)

*Primary Examiner* — Dady Chery
(74) *Attorney, Agent, or Firm* — Holland & Hart LLP

(57) ABSTRACT

Methods, systems, and devices for wireless communications are described. A transmitting device may filter data tones (e.g., in edge subbands of an allocated frequency band) to achieve time domain windowing or shaping. Data tones of edge subbands of a configured frequency band may be filtered to shape a waveform such that it does not extend beyond symbol boundaries (e.g., does not result in emission leakage). In some examples, the transmitter may provide an indication of subband frequency domain shaping filters used to the receiver, to support demodulation on the receiver side. In some examples, the transmitter may indicate a demodulation reference signal (DMRS) comb structure (e.g., of the edge subbands) to the receiver, and the receiver may determine or estimate the filters of the subband frequency domain shaping based on the comb structure or the indication of the filters.

30 Claims, 22 Drawing Sheets

(56) References Cited

U.S. PATENT DOCUMENTS

2018/0054341 A1    2/2018  Jia et al.

OTHER PUBLICATIONS

Yli-Kaakinen J., et al., "Generalized Fast-Convolution-based Filtered-OFDM: Techniques and Application to 5G New Radio", arXiv:1903.02333v2 [c2.IT], Arxiv.Org, Cornell University Library, 201 Olin Library Cornell University Ithaca, NY 14853, Mar. 6, 2019, Feb. 15, 2020, pp. 1-17, Figure 3, Section II.D.

* cited by examiner

SPECTRUM SHAPING AND SUBBAND SPECTRUM SHAPING FOR TIGHT SPECTRUM CONFINEMENT AND TRANSCEIVER STRUCTURE

FIELD OF TECHNOLOGY

The following relates to wireless communications, including spectrum shaping and subband spectrum shaping for tight spectrum confinement and transceiver structure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support spectrum shaping and subband spectrum shaping for tight spectrum confinement and transceiver structure. For example, a transmitting device may filter data tones (e.g., in edge subbands of an allocated frequency band) to achieve time domain windowing or shaping. Data tones of edge subbands of a configured frequency band may be filtered to shape a waveform such that it does not extend beyond symbol boundaries (e.g., does not result in emission leakage). Additionally, or alternatively, by filtering subband edges, noise across symbols may decrease, allowing for tighter spectrum confinement. Such techniques may thus result in a decrease in the size of guard-bands used between signals multiplexed together or between carriers as interference (e.g., noise) between the symbols is decreased or avoided. Such techniques allowing for smaller guard-bands (e.g., or no guard band) may also increase spectrum efficiency and throughput, due to the increased availability of resources that would otherwise be allocated for guard bands. In some examples, the transmitter may provide an indication of subband frequency domain shaping filters used to the receiver, to support demodulation on the receiver side. In some examples, the transmitter may indicate a demodulation reference signal (DMRS) comb structure (e.g., of the edge subbands) to the receiver, and the receiver may determine or estimate the filters of the subband frequency domain shaping based on the comb structure or the indication of the filters.

A method for wireless communications at a transmitting device is described. The method may include communicating control signaling indicating an allocation of a frequency band having a first edge subband and a second edge subband, generating a first set of filtered data tones associated with the first edge subband and a second set of filtered data tones associated with the second edge subband using at least one subband spectrum shaping filter, and transmitting one or more waveforms via the frequency band based on the first set of filtered data tones and the second set of filtered data tones.

An apparatus for wireless communications at a transmitting device is described. The apparatus may include a processor, memory coupled with the processor, and instructions stored in the memory. The instructions may be executable by the processor to cause the apparatus to communicating control signal indicating an allocation of a frequency band having a first edge subband and a second edge subband, generate a first set of filtered data tones associated with the first edge subband and a second set of filtered data tones associated with the second edge subband using at least one subband spectrum shaping filter, and transmit one or more waveforms via the frequency band based on the first set of filtered data tones and the second set of filtered data tones.

Another apparatus for wireless communications at a transmitting device is described. The apparatus may include means for communicating control signaling indicating an allocation of a frequency band having a first edge subband and a second edge subband, means for generating a first set of filtered data tones associated with the first edge subband and a second set of filtered data tones associated with the second edge subband using at least one subband spectrum shaping filter, and means for transmitting one or more waveforms via the frequency band based on the first set of filtered data tones and the second set of filtered data tones.

A non-transitory computer-readable medium storing code for wireless communications at a transmitting device is described. The code may include instructions executable by a processor to communicating control signal indicating an allocation of a frequency band having a first edge subband and a second edge subband, generate a first set of filtered data tones associated with the first edge subband and a second set of filtered data tones associated with the second edge subband using at least one subband spectrum shaping filter, and transmit one or more waveforms via the frequency band based on the first set of filtered data tones and the second set of filtered data tones.

In some examples of the method, apparatuses, and non-transitory computer-readable medium described herein, transmitting the one or more waveforms may include operations, features, means, or instructions for transmitting a DFT-S waveform via the first edge subband and the second edge subband and transmitting an OFDM multiplexed waveform via a central subband of the frequency band.

Some examples of the method, apparatuses, and non-transitory computer-readable medium described herein may further include operations, features, means, or instructions for transmitting, to a receiving device, an indication of one or more filters associated with the at least one subband spectrum shaping filter.

Some examples of the method, apparatuses, and non-transitory computer-readable medium described herein may further include operations, features, means, or instructions for transmitting, to a receiving device, an indication of a bandwidth of the first edge subband, a bandwidth of the second edge subband, or both, associated with the at least one subband spectrum shaping filter.

In some examples of the method, apparatuses, and non-transitory computer-readable medium described herein, transmitting the one or more waveforms may include operations, features, means, or instructions for transmitting the one or more waveforms according to a comb structure, where transmitting one or more DMRS via a DMRS symbol may be based on the comb structure.

In some examples of the method, apparatuses, and non-transitory computer-readable medium described herein, generating the first set of filtered data tones and the second set of filtered data tones may include operations, features, means, or instructions for applying a first subband spectrum shaping filter to a first set of data tones associated with the first edge subband to generate the first set of filtered data tones and applying a second subband spectrum shaping filter to a second set of data tones associated with the second edge subband to generate the second set of filtered data tones.

Some examples of the method, apparatuses, and non-transitory computer-readable medium described herein may further include operations, features, means, or instructions for applying one or more filters to a third set of data tones that may be associated with one or more center subbands of the frequency band.

In some examples of the method, apparatuses, and non-transitory computer-readable medium described herein, applying the first subband spectrum shaping filter may include operations, features, means, or instructions for convolving the first set of data tones with the first subband spectrum shaping filter to generate the first set of filtered data tones to generate the first set of filtered data tones, and where applying the second subband spectrum shaping filter includes and convolving the second set of data tones with the second subband spectrum shaping filter to generate the second set of filtered data tones.

A method for wireless communications at a receiving device is described. The method may include communicating control signaling indicating an allocation of a frequency band having a first edge subband and a second edge subband, receiving one or more waveforms via the frequency band, and demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

An apparatus for wireless communications at a receiving device is described. The apparatus may include a processor, memory coupled with the processor, and instructions stored in the memory. The instructions may be executable by the processor to cause the apparatus to communicating control signal indicating an allocation of a frequency band having a first edge subband and a second edge subband, receive one or more waveforms via the frequency band, and demodulate the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

Another apparatus for wireless communications at a receiving device is described. The apparatus may include means for communicating control signaling indicating an allocation of a frequency band having a first edge subband and a second edge subband, means for receiving one or more waveforms via the frequency band, and means for demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

A non-transitory computer-readable medium storing code for wireless communications at a receiving device is described. The code may include instructions executable by a processor to communicating control signal indicating an allocation of a frequency band having a first edge subband and a second edge subband, receive one or more waveforms via the frequency band, and demodulate the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

In some examples of the method, apparatuses, and non-transitory computer-readable medium described herein, receiving the one or more waveforms may include operations, features, means, or instructions for receiving a discrete Fourier transform spread (DFT-S) waveform via the first edge subband and the second edge subband and receiving an orthogonal frequency domain (OFDM) multiplexed waveform via a central subband of the frequency band.

Some examples of the method, apparatuses, and non-transitory computer-readable medium described herein may further include operations, features, means, or instructions for receiving, from a transmitting device, an indication of one or more filters associated with the at least one subband spectrum shaping filter, where demodulating the one or more waveforms may be based on the indication of the one or more filters.

Some examples of the method, apparatuses, and non-transitory computer-readable medium described herein may further include operations, features, means, or instructions for receiving, from the transmitting device, an indication of a bandwidth of the first edge subband, a bandwidth of the second edge subband, or both, associated with the at least one subband spectrum shaping filter.

In some examples of the method, apparatuses, and non-transitory computer-readable medium described herein, receiving the one or more waveforms may include operations, features, means, or instructions for receiving, from a transmitting device, the one or more waveforms according to a comb structure, where receiving one or more DMRS via a DMRS symbol may be based on the comb structure.

Some examples of the method, apparatuses, and non-transitory computer-readable medium described herein may further include operations, features, means, or instructions for estimating the at least one subband spectrum shaping filter based on the DMRS comb structure, where demodulating the one or more waveforms may be based on the at least one estimated subband spectrum shaping filter.

In some examples of the method, apparatuses, and non-transitory computer-readable medium described herein, demodulating the one or more waveforms may include operations, features, means, or instructions for performing an inter-carrier interference equalization procedure on the first set of filtered data tones and the second set of filtered data tones.

In some examples of the method, apparatuses, and non-transitory computer-readable medium described herein, demodulating the one or more waveforms may include operations, features, means, or instructions for performing a mean square estimate procedure on the first set of filtered data tones and the second set of filtered data tones.

DETAILED DESCRIPTION

Wireless communications may support various waveforms, and multiple-access designs. However, some waveforms or designs may not support wireless communications in some use cases. For example, waveforms that result in high throughput and limited interference for one use case (e.g., half duplex signaling) may result in increased interference and emissions leakage across time interval boundaries in other use cases (e.g., full duplex signaling). Thus, in some use cases, such as full duplex signaling, wireless communications may suffer degraded reliability and increased interference.

Waveforms and filters described herein support tighter spectrum confinement compatible with various waveform designs, resulting in decreased emission leakage across symbol boundaries. For example, a transmitting device may filter data tones (e.g., in edge subbands) to achieve time domain windowing or shaping. Data tones of edge subbands of an allocated frequency band may be filtered to shape a time domain waveform to reduce emission leakage across symbol boundaries. Additionally, or alternatively, by filtering subband edges, noise across symbols may decrease, allowing for tighter spectrum confinement. Such techniques may thus result in a decrease in the size of guard-bands used between signals multiplexed together or between carriers as interference (e.g., noise) between the symbols is decreased or avoided. Such techniques allowing for smaller guard-bands (e.g., or no guard band) may also increase spectrum efficiency and throughput, due to the increased availability of resources that would otherwise be allocated for guard bands.

In some examples, the transmitter may provide an indication of subband frequency domain shaping filters used to the receiver, to support demodulation on the receiver side. In some examples, the transmitter may indicate a demodulation reference signal (DMRS) comb structure (e.g., of the edge subbands) to the receiver, and the receiver may determine or estimate the filters of the subband frequency domain shaping based on the comb structure or the indication of the filters. Such communications from the transmitter to the receiver may facilitate effective and efficient reception of waveforms transmitted according to techniques described herein.

Aspects of the disclosure are initially described in the context of wireless communications systems. Aspects of the disclosure are further illustrated by and described with reference to wireless communications systems, spectrum confinement schemes, waveform design schemes, flow diagrams, and process flows. Aspects of the disclosure are further illustrated by and described with reference to apparatus diagrams, system diagrams, and flowcharts that relate to spectrum shaping and subband spectrum shaping for tight spectrum confinement and transceiver structure.

Figure 1:
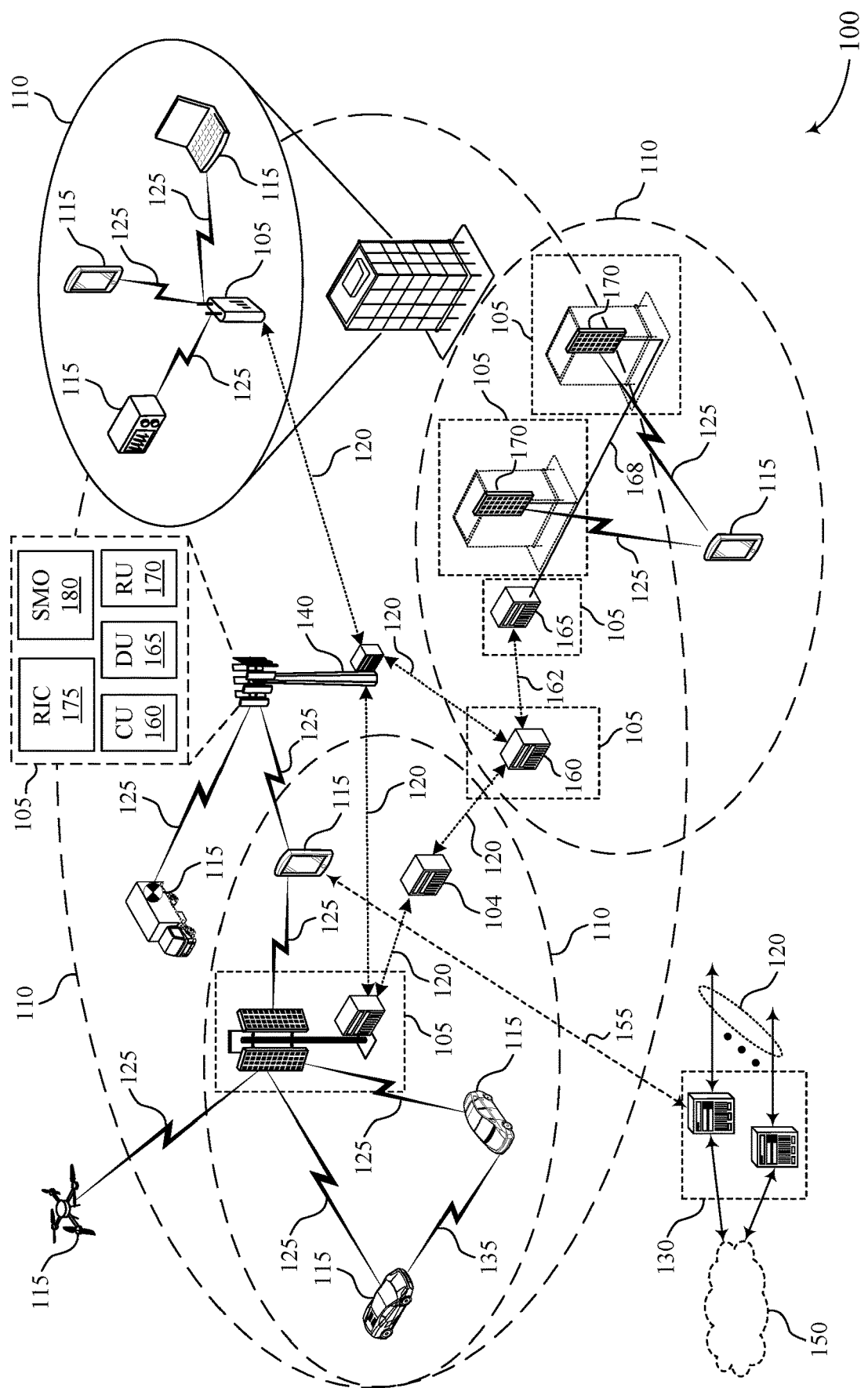
FIG. 1 illustrates an example of a wireless communications system that supports spectrum shaping and subband spectrum shaping for tight spectrum confinement and transceiver structure in accordance with one or more aspects of the present disclosure.

FIG. 1 illustrates an example of a wireless communications system 100 that supports spectrum shaping and subband spectrum shaping for tight spectrum confinement and transceiver structure in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the described waveforms and filtering applied in the context of a disaggregated RAN architecture, one or more components of the disaggregated RAN architecture may be configured to support spectrum shaping and subband spectrum shaping for tight spectrum confinement and transceiver structure as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A transmitting device (e.g., a network entity 105 or a UE 115) may filter data tones (e.g., in edge subbands of an allocated frequency band) to achieve time domain windowing or shaping. Data tones of edge subbands of a configured frequency band may be filtered to shape a waveform such that it does not extend beyond symbol boundaries (e.g., does not result in emission leakage). Additionally, or alternatively, by filtering subband edges, noise across symbols may decrease, allowing for tighter spectrum confinement. Such techniques may thus result in a decrease in the size of guard-bands used between signals multiplexed together or between carriers as interference (e.g., noise) between the symbols is decreased or avoided. Such techniques allowing for smaller guard-bands (e.g., or no guard band) may also increase spectrum efficiency and throughput, due to the increased availability of resources that would otherwise be allocated for guard bands. In some examples, the transmitter may provide an indication of subband frequency domain shaping filters used to the receiver, to support demodulation on the receiver side. In some examples, the transmitter may indicate a DMRS comb structure (e.g., of the edge subbands) to the receiver, and the receiver may determine or estimate the filters of the subband frequency domain shaping based on the comb structure or the indication of the filters.

Figure 2:
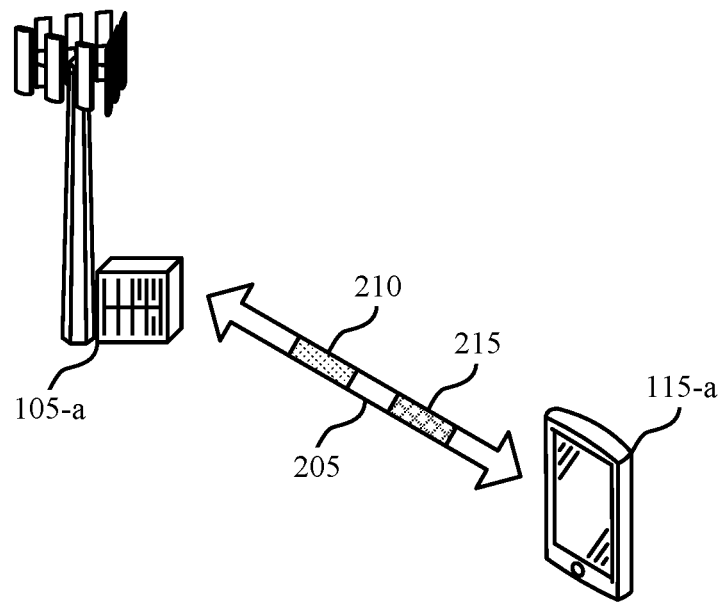
FIG. 2 illustrates an example of a wireless communications system that supports spectrum shaping and subband spectrum shaping for tight spectrum confinement and transceiver structure in accordance with one or more aspects of the present disclosure.
Figure 2:
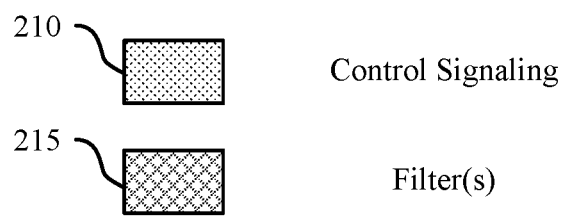

FIG. 2 illustrates an example of a wireless communications system 200 that supports spectrum shaping and subband spectrum shaping for tight spectrum confinement and transceiver structure in accordance with one or more aspects of the present disclosure. In some examples, the wireless communication system 200 may implement or be implemented by the wireless communication system 100. For example, the wireless communications system 200 may include a UE 115-a and a network entity 105-a, which may represent examples of corresponding devices described herein (e.g., with reference to FIG. 1). In some examples, the network entity 105-a and the UE 115-a communicate with each other via a communication link 205. In some cases, the communication link 205 may be an example of a Uu link or other types of data and communication links (e.g., a communication link 125 as described in greater detail with reference to FIG. 1).

In some examples, the wireless communication systems 200 may support multiple waveform and multiple access designs to support a wide variety of use cases. For example, the different use cases may include mobile broadband, metaverse operations, massive Internet of Things (IoT) uses, sidelink communications, massive spectrum aggregation and duplexing, or UE 115 cooperation, among other examples. Such waveform and multiple-access designs may also support systems and technologies for full duplex modes, radio frequency (RF) sensing, positioning of UEs 115, physical layer security, among other examples. However, as technologies evolve, such as digital pre-distortion (DPD) techniques and data protection on demand (DPoD) technologies, existing waveforms and multiple access designs may not successfully support at least some types of wireless communications. For example, as RF, duplexing, and MIMO technologies continue to evolve, existing waveform designs to support such technologies may be deficient. For example, technique described herein may support new multiple access or waveform designs, and may further support massive connectivity and extremely high cell-capacity. As such, techniques described herein may support efficient channel access for a larger number of users than previously supported, and may support more reliable communications without a related increase in interference and noise.

In some cases, waveform designs described herein may be designed to satisfy certain metrics. For example, the waveform design metric considerations may include increasing spectrum efficiency, increasing energy efficiency (e.g., both transmission and receiving energy efficiency), decreasing waveform process complexity and latency, reducing the impact of RF impairments (e.g., such as an error vector magnitude (EVM)), increasing spectrum confinement (e.g., both in-band (IB) and out-of-band (OOB) emissions), and including support for efficient multi-user or MIMO multiple-access. Additionally, or alternatively, certain metrics for various channel conditions/impairments may include fading time variations, inter-symbol interference (ISI), phase noise, and power amplifier (PA) nonlinearity or inter modulation. Techniques described herein may thus address changed or updated fundamental assumptions, such as new baselines based on state-of-the-art implementations (e.g., evolution and progress in DPD, DPoD technologies, among other examples). In some examples, such design metrics for techniques described herein may support cases such as spectrum confinement for full-duplex modes and joint senses and communication use cases. As such, key design metrics may relate to reducing power consumption, implementation complexity, overhead, and leakage between signals and channels, and increased throughput, efficiency, and spectrum confinement, at both the network entity 105-*a* and the UE 115-*a*.

Some waveform designs such as a CP-OFDM design with the addition of a weighted overlap and add (WOLA) design may support one or more of the design metrics. WOLA may be an example of a time-domain windowing technique that may be applied by a transmitter (e.g., the network entity 105-*a* or the UE 115-*a*) to limit OOB leakage of a signal at a receiver (e.g., the UE 115-*a* or the network entity 105-*a*). In some cases, WOLA may be relatively low complexity scheme resulting in efficient implementations by transmitter and receiver, and may support relatively good spectrum confinement compared to other waveform designs (e.g., a CP-OFDM design without the addition of WOLA). However, the addition of WOLA may cause increased power leakage between adjacent channels compared to other waveform designs. For example, WOLA may cause an increase in an adjacent channel leakage ratio (ACLR), which is the ratio of a filtered mean power on a current channel to the filtered mean power of an adjacent channel. In some cases, a filter 215 (e.g., with a long filter length) may be applied to the CP-OFDM design and may produce a relatively tighter spectrum confinement, compared to that of using WOLA. However, the increase in spectrum confinement may also increase the ISI and the EVM of the generated waveform. In some other cases, other waveform designs such a filter-bank multi-carrier (FBMC) may be used. FBMC may be an alternative to the CP-OFDM waveform design and may be desired for transmissions with high data rates. While FBMC may allow for a relatively good spectrum efficiency compared to CP-OFDM and CP-OFDM with WOLA, such improvements may be reduced with PA nonlinearity. Additionally, or alternatively, FBMC may be relatively more complex to other designs as FBMC may cause higher transmission and receiving complexity. In some cases, FBMC may also be subject to increase ISI under non-flat channels. As described, while some of these designs such as WOLA and FBMC may satisfy some design metrics for some wireless communications, such designs may be computationally inefficient and may cause leakage between symbols in other examples of wireless communications. Additionally, or alternatively, such designs may not be compatible with a CP-OFDMA waveform design, which may be a multi-user version of the CP-OFDM design.

Techniques described herein, with reference to FIGS. 3-9, introduce a waveform design and transmission methods supporting a tighter spectrum confinement than the other schemes described above. In some examples, wireless devices may utilize techniques described herein to achieve tighter spectrum confinement in use cases such as full duplex and sub-band full duplex operations, frequency division duplexing (FDD) with increased transmission power or low duplexer insertion loss, different numerologies multiplexed together, asynchronous transmissions, and other radio technology, and may filter edge bands (e.g., apply a frequency domain filter to data tones) to support such tight spectrum confinement and reduction of emissions leakage between time domain symbols. As such, the waveform designs described herein may allow for more efficient and accurate communications between the UE 115-*a* and the network entity 105-*a*.

In such cases, the network entity 105-*a* may transmit, via the communication link 205, control signaling 210, to the UE 115-*a*, indicating a frequency band having a first edge subband and a second edge subband. The network entity 105-*a* may filter such edge subbands of the frequency band using one or more frequency domain filters to reduce ISI and leakage between symbols. In some cases, the one or more filters 215, transmitted to the UE 115-*a* from the network entity 105-*a*, may indicate a quantity of data tones (e.g., quantity of RBs) to be filtered using the one or more filters 215. As such, the UE 115-*a* may use the indication when decoding one or more waveforms transmitted from the network entity 105-*a* via the frequency band, allocated in the control signaling 210.

The one or more filters 215 used by the network entity 105-*a* may support the generation of a waveform design that may satisfy the design metrics for tight spectrum confinement described herein. The network entity 105-*a* may use the indicated one or more filters 215 to filter the subband edges of one or more waveforms, which may be transmitted via the frequency band allocated via the control signaling 210. Such techniques, methods, and systems used to filter subband edges to support a tight spectrum confinement may be further described elsewhere herein, including with reference to FIGS. 3-9.

Figure 3:
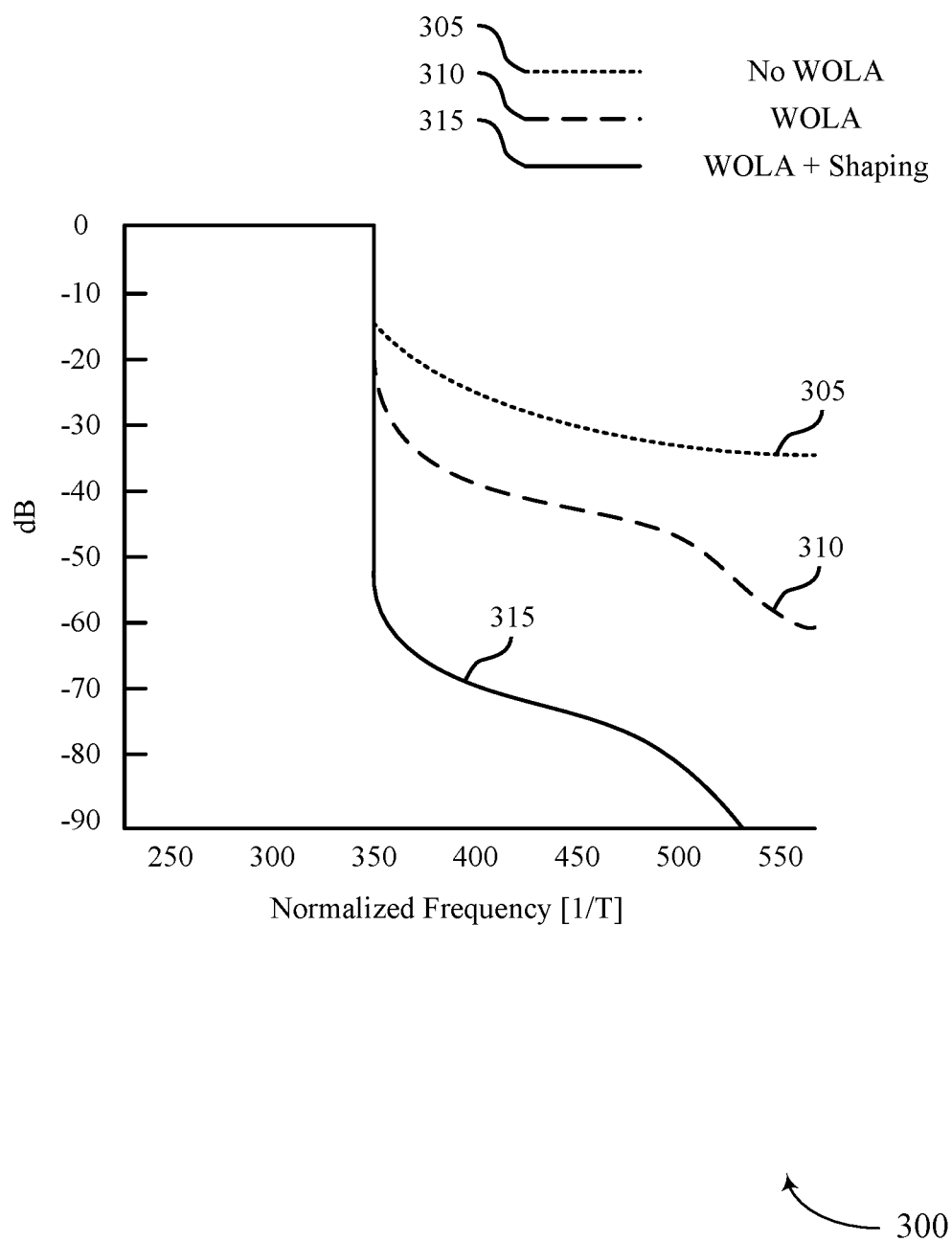
FIG. 3 illustrates an example of a spectrum confinement scheme that supports spectrum shaping and subband spectrum shaping for tight spectrum confinement and transceiver structure in accordance with one or more aspects of the present disclosure.

FIG. 3 illustrates an example of a spectrum confinement scheme 300 that supports spectrum shaping and subband spectrum shaping for tight spectrum confinement and transceiver structure in accordance with one or more aspects of the present disclosure. In some examples, the spectrum confinement scheme 300 may implement or be implemented by the wireless communication system 100 or wireless communications system 200. The spectrum confinement scheme 300 may illustrate symbols of three different waveform designs which may be plotted as functions of decibels (dB) versus frequency. For example, the spectrum confinement scheme 300 may illustrate a waveform 305 which may represent a symbol of a first waveform 305 (e.g., a CP-OFDM waveform without WOLA, a second waveform 310 (e.g., which may represent a symbol of the CP-OFDM waveform design with WOLA), and a third waveform 315, which may represent a symbol of the CP-OFDM waveform design with WOLA and shaping (e.g., according to techniques described herein).

Different waveforms may result in different signal roll-off at the edge of a symbol (e.g., a CP-OFDM symbol) based on the different waveform designs. Such roll-off (e.g., based on the third waveform 315) may allow for a smooth transition between symbols and reduced spectral emissions and power leakage between symbol edges. For example, as shown by the first waveform 305, the CP-OFDM waveform design without WOLA may result in a gradual roll-off compared to the second waveform 310 (e.g., the CP-OFDM waveform design with WOLA). However, the roll-offs represented by the waveform 305 and the waveform 310 may be deficient in reducing spectral emissions across symbol boundaries (e.g., for some types of communications, such as full duplex communications, among other examples).

Techniques described herein may introduce a shaping filter (e.g., a frequency domain filter) over a set of data tones (e.g., a set of RBs) to achieve time domain shaping (e.g., which may be referred to as windowing). The third waveform 315 may result in a sharp roll-off to reduce energy leakage across symbol boundaries. As illustrated in FIG. 3, the waveform 315 may represent the CP-OFDM waveform design with WOLA with the frequency domain filter applied, which may be defined as $FD_{filter}=[-0.248, 0.5, -0.248]$. In some cases, the waveform 315 may be an example of the waveform 310 with the frequency domain filter applied to the waveform 310. A transmitting device may apply the frequency domain filter for transmissions (e.g., may apply a convolution techniques to convolve a set of data tones with the frequency domain filter to achieve a designed or selected time domain response, such as time domain windowing. In some cases, an inverse fast Fourier transform (IFFT) may be applied to a transmission to generate a time domain waveform. Along with the application of the IFFT, a cyclic prefix (CP) may be applied to the beginning or front of the waveform 315. The CP may be a copy of a final (e.g., last or ending) segment of the waveform 315. Additionally, or alternatively, the filtering may be applied in a time domain waveform, following the application of the IFFT (not illustrated), such that the filtering may take place in the time domain opposed to the frequency domain.

In some cases, a transmitting device may apply spectrum shaping (e.g., filtering) only on a band edge to contain emissions in the symbol (e.g., the edge data tones of an edge subband within a frequency band allocation associated with the symbol). For example, techniques described herein may support increased efficiency to only apply the frequency domain filter to the edge data tones of an allocated band to reduce emission leakage across symbol boundaries. In some cases, these edge data tones may only be a few data tones (e.g., two or three RBs) or they may be a larger set of data tones (e.g., 20 to 30 RBs), however, only the edge sections (e.g., edge tones) of the band may be filtered to achieve the time domain shaping/windowing, leaving the center data tones unfiltered. In some cases, the amount of edge data tones filtered may be equal to the size of the CP of the waveform 315.

Such spectrum shaping or filtering in the frequency domain may help increase roll-off of a waveform (e.g., the waveform 315) on symbol edges therefore reducing leakage or interference across symbol boundaries. Further discussion of filtering the frequency domain to obtain time domain windowing may be additionally described herein, including with reference to FIG. 4.

Figure 4:
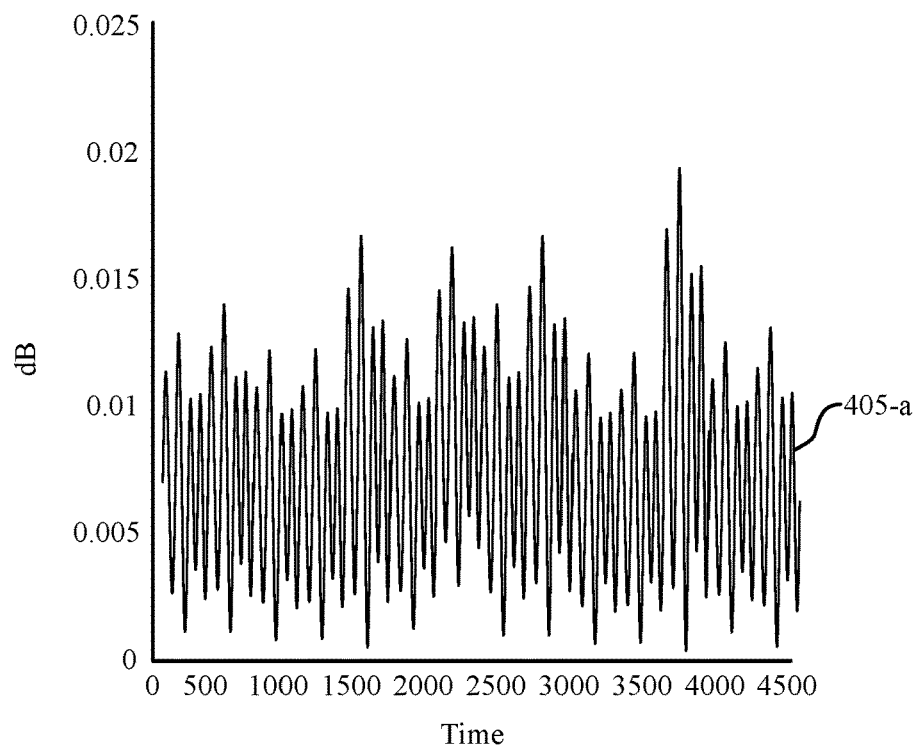
FIG. 4 illustrates an example of a waveform design scheme that supports spectrum shaping and subband spectrum shaping for tight spectrum confinement and transceiver structure in accordance with one or more aspects of the present disclosure.
Figure 4:
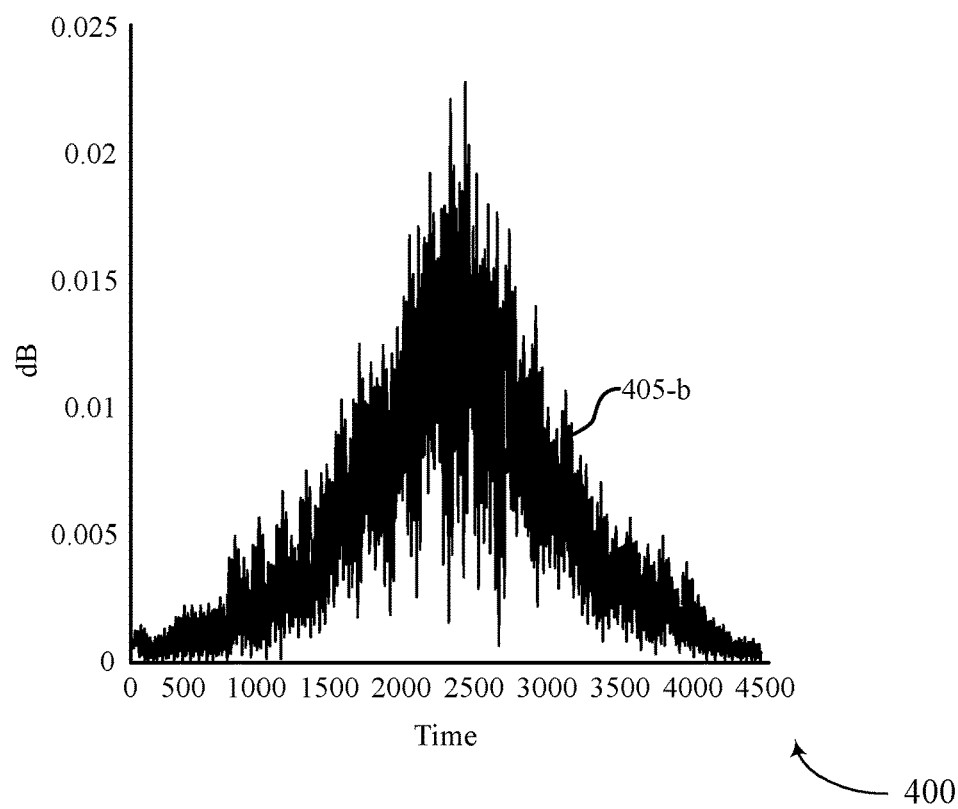

FIG. 4 illustrates an example of a waveform design scheme 400 that supports spectrum shaping and subband spectrum shaping for tight spectrum confinement and transceiver structure in accordance with one or more aspects of the present disclosure. In some examples, the waveform design scheme 400 may implement or be implemented by the wireless communication system 100 or 200. The waveform design scheme 400 may illustrate symbols of two different waveform designs which may be plotted as functions of decibels (dB) versus time. For example, the spectrum confinement scheme 300 may illustrate a time domain waveform 405-a which may represent a symbol of a CP-OFDM waveform design with WOLA and a waveform 405-b which may represent a symbol of the CP-OFDM waveform design with WOLA and shaping. In some cases, the waveform 405-a and the waveform 405-b may also represent a symbol of a DFT-S-OFDM waveform design. As such, the illustrated waveforms may be a time domain waveform having a duration of a single symbol period. In some cases, the waveform 405-a may be a time domain representation of the waveform 310 illustrated in FIG. 3 and the waveform 405-b may be a time domain representation of the waveform 315 illustrated in FIG. 3. In some examples, the waveform 405-b may also be a time domain representation of the waveform 310 illustrated in FIG. 3 with the addition of the frequency domain filtering to the edge data tones of the waveform 310.

As illustrated by the waveform 405-a, when using WOLA, there may be time domain waveform leakage into adjacent symbol periods. WOLA techniques may not result in any roll off at symbol boundaries, resulting in time domain waveforms leaking into adjacent symbol periods. As such, to reduce such leakage across symbol boundaries in the time domain, a frequency domain filter may be applied to the waveform 405-a to generate the waveform 405-b (e.g., to introduce roll off in the time domain waveform 405-a, reducing time domain waveform leakage into adjacent symbol periods). As shown, the frequency domain filter may support the waveform 405-b including a roll-off on the symbol edges which may support reduced interference and emissions leakage between adjacent symbols. The waveform 405-b may be windowed, according to techniques described herein, to be smooth on symbol edges.

However, in some cases, the CP of the waveform 405-b may cause slight discontinuity (e.g., elevation) at the symbol boundary or edge of the waveform 405-b. In some examples, WOLA may be applied to the edges of the waveform 405-b to mitigate the impact of the CP (e.g., to support a sharper roll-off on the edge data tones). Additionally, or alternatively, the waveform 405-b may implement a zero-tail based waveform design. The zero-tail based waveform design may include making a CP equal to zero.

As such, the shaping done to the waveform 405-a to generate the waveform 405-b may support reduced interference between symbols and may reduce emissions leakage across the symbol edges. In some cases, a transmitting device (e.g., such as a network entity 105 or a UE 115) may generate the waveform 405-b (e.g., by applying filtering and shaping techniques described herein) and transmit the waveform 405-b to a receiving device (e.g., such as the UE 115 or the network entity 105). As such, the receiving device may receive the waveform 405-b and apply a fast Fourier transform (FFT) to generate a frequency domain waveform to be equalized and decoded for the generation of log-likelihood ratios (LLRs). Such processes of generating waveforms (e.g., such as the waveform 405-b), at the transmitting device, and decoding the waveforms, at the receiving device, may be described elsewhere herein including with reference to FIGS. 5-10.

Figure 5:
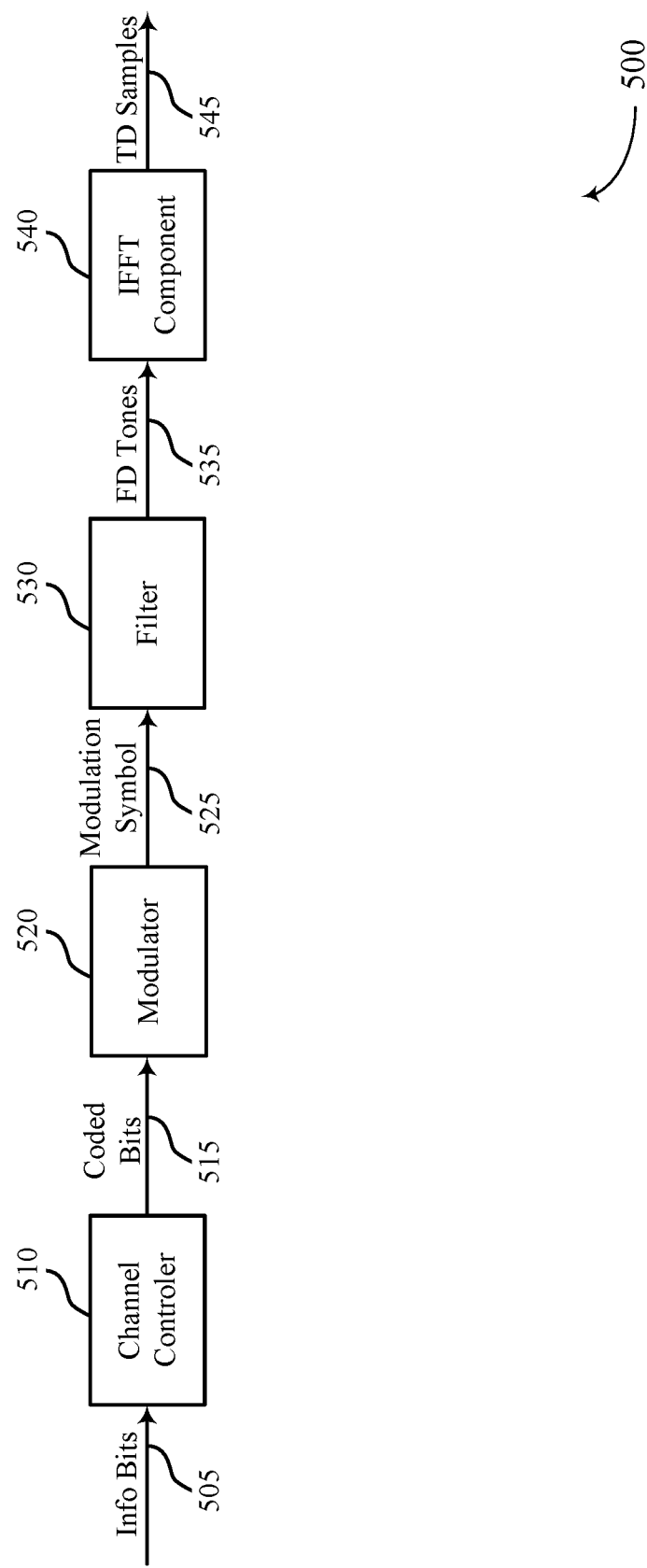
FIG. 5 illustrates an example of a flow diagram that supports spectrum shaping and subband spectrum shaping for tight spectrum confinement and transceiver structure in accordance with one or more aspects of the present disclosure.

FIG. 5 illustrates an example of a flow diagram 500 that supports spectrum shaping and subband spectrum shaping for tight spectrum confinement and transceiver structure in accordance with one or more aspects of the present disclosure. Flow diagram 500 may implement aspects of, or be implemented by aspects of, wireless communications system 100, wireless communications system 200, spectrum confinement scheme 300, or waveform design scheme 400. For example, a transmitting device (e.g., a network entity 105 or a UE 115) may communicate according to flow diagram 500, and may be an example of corresponding devices described with reference to FIGS. 1-4. The transmitting device may include one or more of an forward error correction (FEC) component 510, a modulator 520, a filter 530 (e.g., or any component to apply one or more filters), and an IFFT component 540, among other components.

The transmitting device may perform frequency domain filtering to achieve time domain shaping of the waveform (e.g., resulting in spectrum confinement). In some examples, the FEC component 510 may receive one or more information bits 505, and perform channel FEC on the received information bits 505. The FEC component 510 may generate coded bits 515. The modulator 520 may modulate one or more symbols resulting in modulation symbols 525. As described herein, the transmitter may perform subband based frequency domain filtering (e.g., by the filter 530). For example, the filter 530 may apply a convolution technique to convolve one or more frequency tones (e.g., edge frequency tones at a band edge) with a frequency domain filter to generate the frequency domain tones 535 (e.g., filtered tones). The IFFT component 540 may perform an IFFT procedure on the frequency domain tones, resulting in one or more time domain samples 545, which the transmitting device may transmit to a receiving device. By performing the subband based frequency domain filtering, the transmitting device may shape the time domain samples 545 to reduce or eliminate noise at the symbol edges of the time domain waveforms, resulting in decreased interference and emission leakage across symbol boundaries.

In some examples, subband frequency domain implementation may be realized by using an inverse discrete Fourier Transform (IDFT) (e.g., by the modulator 520 to generate the modulation symbols 525) on one or more subbands to generate time domain samples. The transmitter may then apply windowing (e.g., shaping to the time domain waveform), apply the DFT again to generate subband frequency domain samples, and perform subband tone mapping followed by iFFT to generate the TD samples 545.

Figure 6:
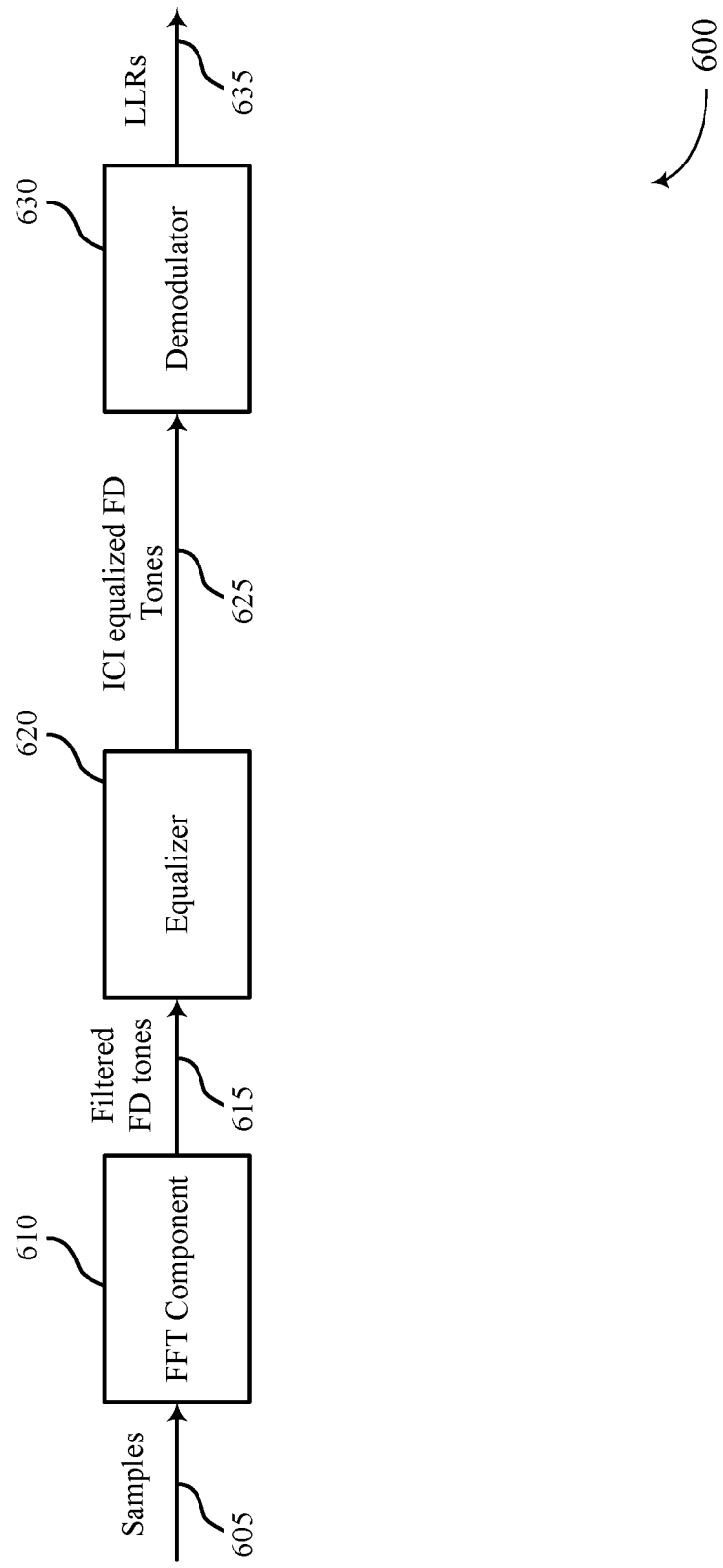
FIG. 6 illustrates an example of a flow diagram that supports spectrum shaping and subband spectrum shaping for tight spectrum confinement and transceiver structure in accordance with one or more aspects of the present disclosure.

FIG. 6 illustrates an example of a flow diagram 600 that supports spectrum shaping and subband spectrum shaping for tight spectrum confinement and transceiver structure in accordance with one or more aspects of the present disclosure. Flow diagram 600 may implement aspects of, or be implemented by aspects of, wireless communications system 100, wireless communications system 200, spectrum confinement scheme 300, waveform design scheme 400, or flow diagram 500. For example, a receiving device (e.g., a network entity 105 or a UE 115) may communicate according to flow diagram 600, and may be an example of corresponding devices described with reference to FIGS. 1-5. The receiving device may include one or more of an FFT component 610, an equalizer 620, and a demodulator 630, among other components.

The receiving device may perform frequency domain equalization to mitigate intercarrier interference (ICI) introduced from spectrum shaping via a frequency domain filter (e.g., such as a filter 530 described with reference to FIG. 6). The FFT component 610 may receive one or more samples 605 (e.g., may receive a transmission from a transmitting device that performed subband based frequency domain filtering according to techniques described herein), and may perform an FFT procedure to generate the filtered frequency domain tones 615 (e.g., the frequency domain tones filtered by the transmitting device). The equalizer 620 may receive the filtered frequency domain tones 615, and may perform frequency domain equalization on the filtered frequency domain tones, generating ICI equalized frequency domain tones 625. The demodulator 630 may perform combining (e.g., minimum mean square error (MMSE) combining) and demodulation on the equalized frequency domain tones, and may generate one or more LLRs 635 based on the demodulation.

In some examples, the receiving device may perform frequency domain ICI equalization by performing time domain equalization (e.g., MMSE weighting procedure) to remove ICI. After performing the FFT procedure at the FFT component 610, the receiving device may transform subband resource blocks (e.g., edge tones or edge resource blocks) using an IDFT. The receiving device may then equalize the time domain samples (e.g., based on known spectrum shaping filters, which may be indicated to the receiving device by the transmitting device, or based on channel estimates and ICI estimates). The receiving device may then equalize the time domain samples (e.g., at the equalizer 620) and the receiving device may generate frequency domain tones by performing a DFT procedure on the equalized time domain samples.

Figure 7:
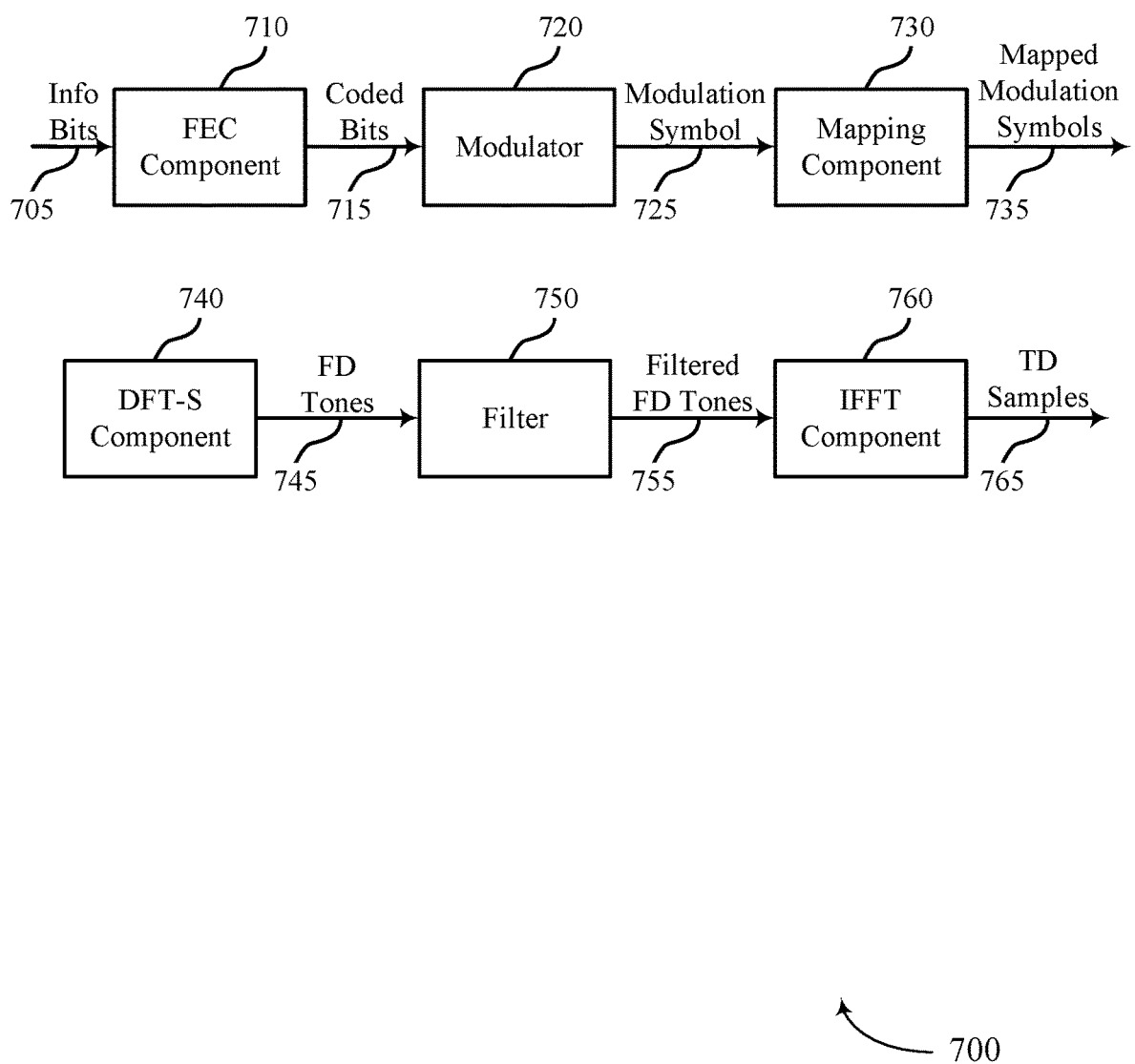
FIG. 7 illustrates an example of a flow diagram that supports spectrum shaping and subband spectrum shaping for tight spectrum confinement and transceiver structure in accordance with one or more aspects of the present disclosure.

FIG. 7 illustrates an example of a flow diagram 700 that supports spectrum shaping and subband spectrum shaping for tight spectrum confinement and transceiver structure in accordance with one or more aspects of the present disclosure. Flow diagram 700 may implement aspects of, or be implemented by aspects of, wireless communications system 100, wireless communications system 200, spectrum confinement scheme 300, waveform design scheme 400, flow diagram 500, or flow diagram 600. For example, a transmitting device (e.g., a network entity 105 or a UE 115) may communicate according to flow diagram 700, and may be an example of corresponding devices described with reference to FIGS. 1-6. The transmitting device may include one or more of an FEC component 710, a modulator 720, a mapping component 730, a discrete Fourier transform spread (DFT-S) component 740, a filter 750, and an iFFT component 760, among other components.

The transmitting device may perform frequency domain filtering to achieve time domain shaping of the waveform, resulting in improved spectrum confinement. In some examples, the FEC component 710 may receive one or more information bits 705 and perform FEC on the information bits. The FEC component 710 may generate coded bits 715, and the modulator 720 may modulate the coded bits, generating modulation symbols 725. The mapping component 730 may map the modulation symbols 725 (e.g., time domain symbols) to a DFT block and generate a set of mapped modulation symbols 735. For example, a DFT-s-OFDM waveform may be generated by mapping modulated symbols (e.g., in the time domain) to a DFT block. The DFT-S component 740 may perform a DFT-S procedure using the mapped modulation symbols 735 and generate frequency domain tones 745. For example, post-DFT, frequency domain samples may be mapped to a larger iFFT block. The transmitting device may perform subband based frequency domain filter at the filter 750. The filter 750 may generate filtered frequency domain tones 755 (e.g., filtered according to the filter 750). The iFFT component 760 may perform an IFFT procedure on the filtered frequency domain tones 755 by mapping the filtered frequency domain tones 755 to an iFFT block and generate time domain samples 765 for transmission to a receiving device. In some examples, the spectrum shaping may be applied to a DFT-S based waveform (e.g., by the DFT-S component 740) where edge tones may be filtered (e.g., by the filter 750) to introduce ICI to achieve spectrum confinement (e.g., and reduce cross-symbol boundary interference and emissions leakage). The transmitting device may perform the frequency domain filtering (e.g., via the filter 750), post DFT (e.g., via the DFT-S component 730) and before mapping the frequency domain samples to the larger iFFT block (e.g., via the iFFT component 760).

In some examples, the transmitting device may perform spectrum shaping pre-DFT procedure by scaling pre-DFT modulation symbols 725 (e.g., which may be similar to or based on time domain windowing). In some examples, DFT-S waveforms may be applied on the edge of the carrier (e.g., may be subband based), and center tones may use OFDM waveforms (e.g., transmitted without spectrum shaping). In such examples, the transmitter may transmit via edge tones or edge subbands according to the DFT-S waveform and may transmit via center tones or center subbands according to an OFDM waveform. In some examples, DFT-S waveform PAPR may be reduced by introducing DFT based clipping (e.g., to the waveform at or within a threshold distance of the symbol boundaries) without introducing emissions (e.g., across symbol boundaries). In some examples, each subband could have a different filter (e.g., could have different windows for DFT-s-OFDM). In some examples center tones may correspond to OFDM waveforms. In some example, center modulated symbols (e.g., pre-DFT)) may not be filtered or windowed.

Figure 8:
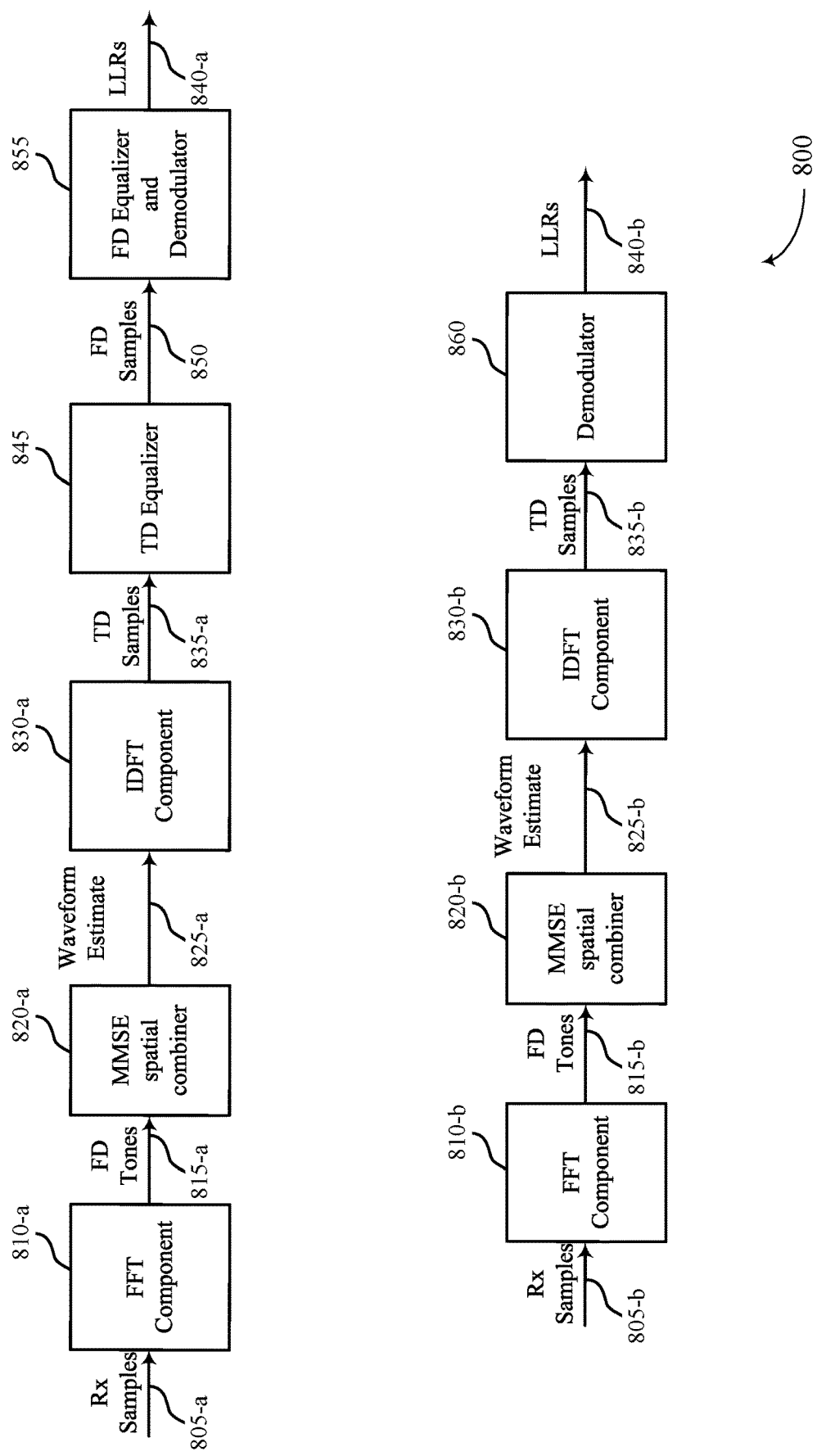
FIG. 8 illustrates an example of a flow diagram that supports spectrum shaping and subband spectrum shaping for tight spectrum confinement and transceiver structure in accordance with one or more aspects of the present disclosure.

FIG. 8 illustrates an example of a flow diagram 800 that supports spectrum shaping and subband spectrum shaping for tight spectrum confinement and transceiver structure in accordance with one or more aspects of the present disclosure. Flow diagram 800 may implement aspects of, or be implemented by aspects of, wireless communications system 100, wireless communications system 200, spectrum confinement scheme 300, waveform design scheme 400, flow diagram 500, flow diagram 600, or flow diagram 700. For example, a receiving device (e.g., a network entity 105 or a UE 115) may communicate according to flow diagram 800, and may be an example of corresponding devices described with reference to FIGS. 1-7. The receiving device may include one or more of an FFT component 810, MMSE spatial combiner 820, IDFT component 830, TD equalizer 845, FD equalizer and demodulator 855, demodulator 860, or any combination thereof, among other components.

In some examples, for subband spectrum shaped DFT-S waveforms on a band edge, the receiving device may process a received signal, including subband based equalization to remove spectrum shaping filtering, and may perform full iDFT procedures to recover entire time domain modulation symbols for LLR generation. For example, the receiver may receive one or more samples 805-a and perform FFT procedures at the FFT component 810-a, generating frequency domain tones 815-a. The MMSE spatial combiner 820-a may perform MMSE spatial combining on the frequency domain tones 815-a, generating a waveform estimate 825-a. The receiving device may perform an IDFT procedure at the IDFT component 830-a, generating time domain samples 835-a. The TD equalizer 845 may perform subband based equalization to remove the spectrum shaping filter, generating frequency domain samples 850. The frequency domain equalizer and demodulator 855 may generate LLRs 840-a.

In some examples, the receiving device may receive a message including DFT-S waveforms (e.g., spectrum shaped DFT-S waveforms in one or more subbands, such as edge subbands) on edge RBs with spectrum shaping (e.g., by the transmitting device). In such examples, the receiving device may be able to receive and demodulate the received signaling without applying frequency domain equalization of the spectrum shaping filter (e.g., because the impact occurs in the time domain windowing, and the modulation symbols are in the time domain). Instead, the receiving device may rely on MMSE spatial combining to generate frequency domain per stream estimates, perform an IDFT to convert to the time domain, and make per modulation symbol estimates using the information of the time domain windowing shape (e.g., frequency domain ICI filter information). For example, the FFT component 810-b may receive samples 805-b, and may perform an FFT procedure to generate frequency domain tones 815-b. The MMSE spatial combiner 820-b may receive the frequency domain tones 815-b and generate a waveform estimate 825-b. The IDFT component 830-b may perform an IDFT procedure, and generate time domain samples 835-b, and the demodulator 860 may demodulate the time domain samples 835-b to generate LLRs 840-b.

Figure 9:
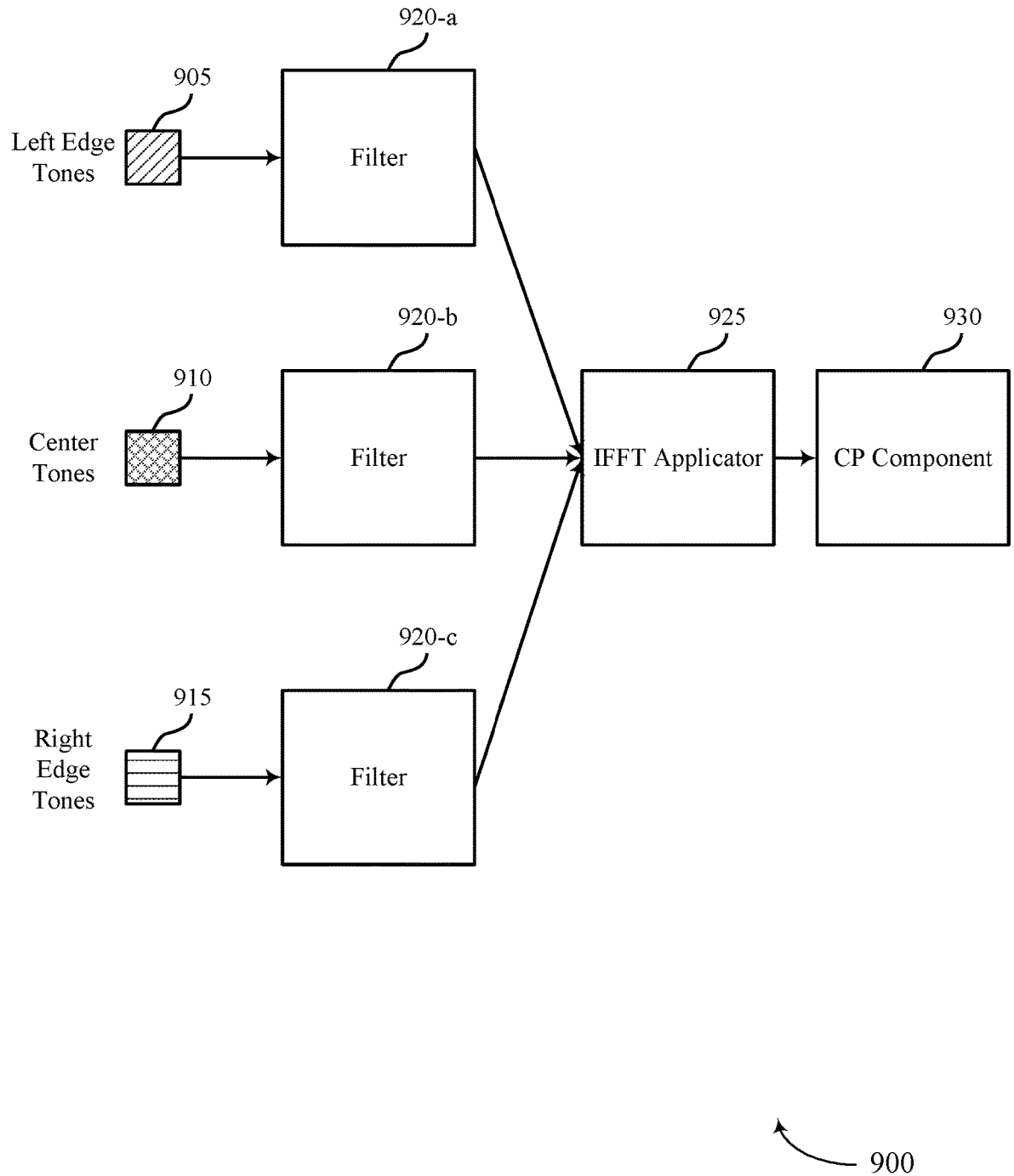
FIG. 9 illustrates an example of a flow diagram that supports spectrum shaping and subband spectrum shaping for tight spectrum confinement and transceiver structure in accordance with one or more aspects of the present disclosure.

FIG. 9 illustrates an example of a flow diagram 900 that supports spectrum shaping and subband spectrum shaping for tight spectrum confinement and transceiver structure in accordance with one or more aspects of the present disclosure. Flow diagram 900 may implement aspects of, or be implemented by aspects of, wireless communications system 100, wireless communications system 200, spectrum confinement scheme 300, waveform design scheme 400, flow diagram 500, flow diagram 600, flow diagram 700, or flow diagram 800. For example, a transmitting device (e.g., a network entity 105 or a UE 115) may communicate according to flow diagram 900, and may be an example of corresponding devices described with reference to FIGS. 1-8. The transmitting device may include one or more filters 920 (e.g., frequency domain filters), an IFFT component 925, and a CP component 930, among other components.

The transmitting device may filter one or more frequency tones (e.g., resulting in time domain waveform shaping) for transmissions to a receiving device. For example, the transmitting device may communicate (e.g., receive of transmit) control signaling indicating an allocation of a frequency band (e.g., including a first edge subband and a second edge subband). In some examples, left tones, right tones, and center tones, may go through different filters 920, which may be signaled from the transmitting device via the control signaling that allocates the frequency band, or via a different control signaling. The filters 920 may be frequency domain filters, and tones of edge subbands may be convolved by the frequency domain filters 920.

In some cases, the transmitting device may transmit an indication of the sizes of subbands of the left edge tones 905, the center tones 910, and the right edge tones 915 to the receiving device along with the filters 920 or the receiving device may infer the sizes (e.g., by performing channel estimation). In some examples. the subband sizes and the filters 920 used may be the same or they may be different for different symbols (e.g., data symbol, DMRS symbol) of a subband. The subband sizes and filters 920 used may also depend on other factors. For example, the subband sizes and filters 920 used may depend on the type of communication band (e.g., some bands may have strict emission requirements), a modulation order, a length of allocation (e.g., quantity of resource blocks in a subband), a placement of allocation (e.g., how close to the edge of the subband a waveform may be), a type of allocation (e.g., contiguous allocation, non-contiguous allocation), a gap size across non-contiguous portions (e.g., if the type of allocation is a non-contiguous allocation), or any combination thereof The transmitting device may generate a first set of filtered data tones associated with the first edge subband and a second set of filtered data tones associated with the second edge subband using at least one subband spectrum shaping filter, where the type of filter used may be based on characteristics of the subband and described herein. For example, the transmitting device may apply a first filter 920-a to left edge tones 905 (e.g., RBs at a band edge, or RBs within a threshold of a band edge), and may apply a filter 920-c to right edge tones 915 (e.g., RBs at the other band edge, or RBs within a threshold of the other band edge), and may apply a filter 920-b to one or more center tones 910. The frequency domain filters 920-a and frequency domain filters 920-c may be applied to convolve the left edge tones 905 and the right edge tones 915, respectively. In some examples, different filters may be applied to each subband of a band. In some cases, one of the filters may be a trivial bypass filter (e.g., the filter 920-b may be a trivial bypass filter for one or more center tones 910).

The transmitting device may transmit one or more waveforms via the frequency band based at least on the first set of filtered data tones and the second set of filtered data tones. For example, the transmitting device may generate OFDM waveforms for both center subbands and edge subbands. In some examples, the transmitting device may generate DFT-S waveforms (e.g., single DFTs) for the edge subbands and OFDM waveforms for center subbands. In some examples, the transmitting device may generate a mixture of OFDM waveforms and DFT waveforms on center and edge subbands. In some examples, the use of DFT-S waveforms on center tones 910 may result in the avoidance of equalization (e.g., for the receiver). Single carrier waveforms, or other waveforms, may be possible for edge subbands (e.g., left edge tones 905 and right edge tones 915). In some examples, the transmitting device may use a comb structure for DMRS on spectrum shaped edge RBs (e.g., and the transmitter may provide an indication of the comb structure to the receiving device, facilitating estimation of the filters and demodulation by the receiving device). For example, in the filtered (e.g., windowed) subbands, transmission may be comb-based (e.g., to reduce the impact of ICI.) Then, on one or more DMRS symbols, the same structure could be used (e.g., to use comb based transmission on the same subbands of the DMRS symbol). In some examples, the transmitting device may transmit an indication of the filters 920 used on the various tones (e.g., edge subbands and center subbands) to the receiver, or the receiver may estimate (e.g., based on the DMRSs or the comb structure, or both) the filters 920, and may demodulate the transmission from the transmitting device based on the indicated or estimated filters. In some cases, when different filters are used on different subbands of the edge tone (e.g., left edge tones 905, center edge tones 910, and right edge tones 915) different modulation orders may be used. For example for windowed edge tones (e.g., DFT-S OFDM waveforms) a more reliable modulation order (e.g., quadrature phase shift keying (QPSK)) and non-filtered or non-windowed edge tones may use higher modulation orders (e.g., 64 quadrature amplitude modulation (64QAM), 256QAM).

Figure 10:
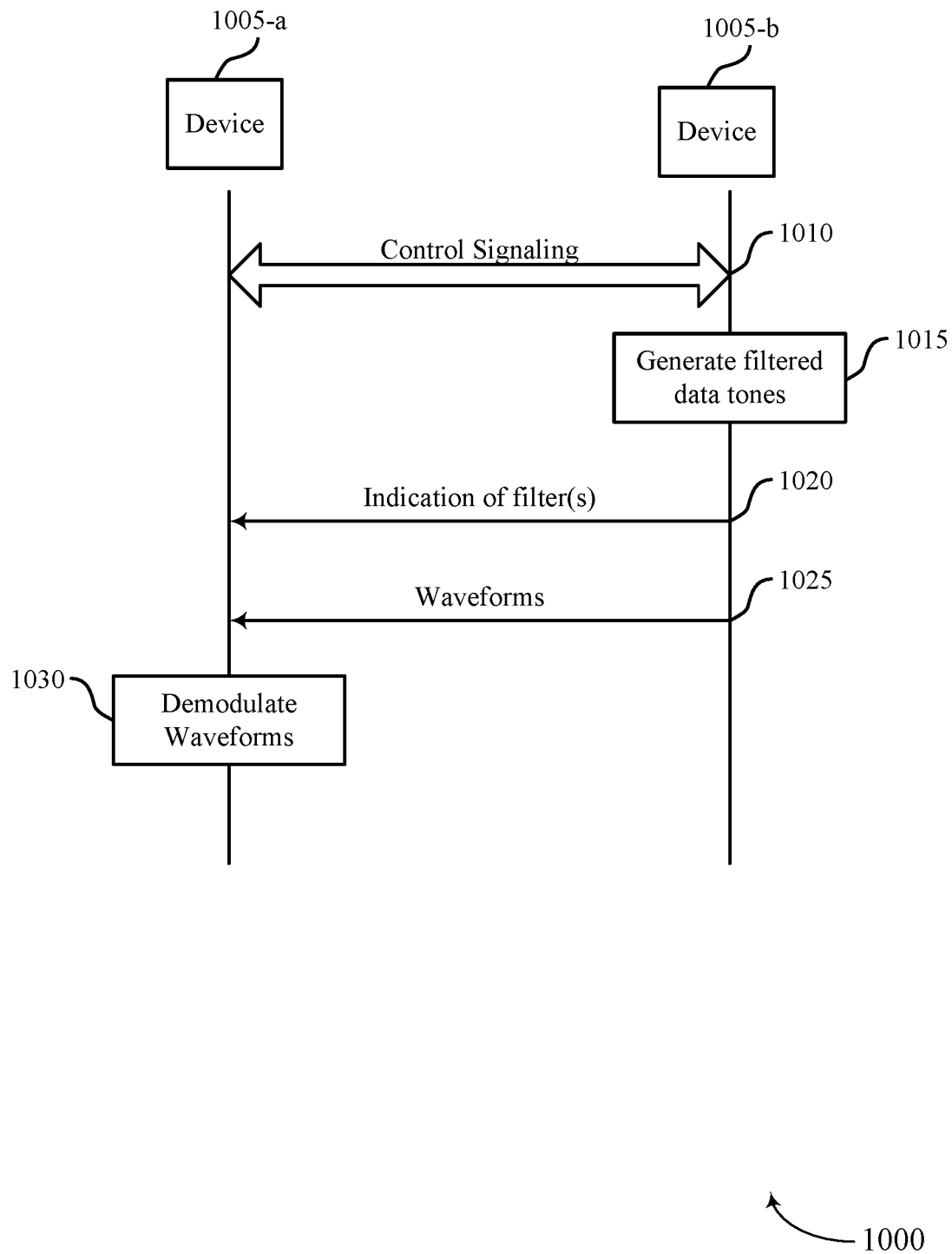
FIG. 10 illustrates an example of a process flow that supports spectrum shaping and subband spectrum shaping for tight spectrum confinement and transceiver structure in accordance with one or more aspects of the present disclosure.

FIG. 10 illustrates an example of a process flow 1000 that supports spectrum shaping and subband spectrum shaping for tight spectrum confinement and transceiver structure in accordance with one or more aspects of the present disclosure. In some examples, the process flow 1000 may implement or be implemented by the wireless communication system 100 or 200. For example, the process flow 1000 may include a first device 1005-a, and a second device 1005-b. In some examples, the first device 1005-a may be a UE 115 or a network entity 105, which may represent examples of corresponding devices described herein (e.g., with reference to FIGS. 1 and 2). In some examples, the second device 1005-b may be a UE 115 or a network entity 105, which may represent examples of corresponding devices described herein (e.g., with reference to FIGS. 1 and 2). In some cases, the device 1005-a may be an example of a receiving device, and the device 1005-b may be an example of a transmitting device, and the device 1005-a and the device 1005-b may implement transmitting and receiving procedures as described herein with reference to FIGS. 2-9.

In the following description of the process flow 1000, the operations between the device 1005-a and the device 1005-b may be performed in different orders or at different times. Some operations may also be left out of the process flow 1000, or other operations may be added. Although the device 1005-a and the device 1005-b are shown performing the operations of the process flow 1000, some aspects of some operations may also be performed by one or more other wireless devices.

At 1010, the device 1005-b, the device 1005-a, or both, may communicate control signaling indicating an allocation of a frequency band having a first edge subband and a second edge subband. For example, a network entity 105 may configure the frequency band for a UE 115. For instance, the frequency band may span a total number of resource blocks (e.g., 100 resource blocks), including a first edge subband (e.g., ten resource blocks including a first set of tones) and a second edge subband (e.g., ten resource blocks including a second set of tones). In some cases, the device 1005-b may transmit, to the device 1005-a, an indication of a bandwidth of the first edge subband, a bandwidth of the second edge subband, or both, association with a subband spectrum shaping filter. Such information may be conveyed via control signaling (e.g., at 1010), or via one or more signals at 1020 (e.g., an indication of one or more filters, which may be applied to the edge subbands, as described in greater detail with reference to FIG. 9).

At 1015, the device 1005-b may generate a first set of filtered data tones (e.g., may convolve the first set of tones with a frequency domain filter) associated with the first edge subband and a second set of filtered data tones (e.g., may convolve the second set of tones with a frequency domain filter) associated with the second edge subband using at least one subband spectrum shaping filter. In some examples, the device 1005-b may apply a same filter to the edge subbands. In some examples, the device 1005-b may apply a first filter to the first edge subband, and a second filter to the second edge subbands (e.g., as described with reference to FIG. 9). In some examples, the device 1005-b may apply a first subband spectrum shaping filter to a first set of data tones associated with the first edge subband to generate the first set of filtered data tones and apply a second subband spectrum shaping filter to a second set of data tones associated with the second edge subband to generate the second set of filtered data tones. In some cases, the device 1005-b may apply one or more filters to a third set of data tones that are associated with one or more center subbands of the frequency band. In some cases, applying the first subband spectrum shaping filter may include convolving the first set of data tones with the first subband spectrum shaping filter to generate the first set of filtered data tones. Additionally, or alternatively, applying the second subband spectrum shaping filter may include convolving the second set of data tones with the second subband spectrum shaping filter to generate the second set of filtered data tones.

At 1020, in some examples, the device 1005-b may transmit, to the device 1005-a, an indication of one or more filters associated with the at least one subband spectrum shaping filter. In some cases, the one or more filters may not be transmitted, from the device 1005-b to the device 1005-a. As such, the device 1005-a may estimate the at least one subband spectrum shaping filter (e.g., a frequency domain filter) based at least on the demodulation reference signal comb structure (e.g., received at 1005, or received at 1020). The device 1005-a may, in some examples, estimate the frequency domain filter values (e.g., $FD_{filter}$=[−0.248, 0.5, −0.248], as described with reference to FIG. 3).

At 1025, the device 1005-b may transmit one or more waveforms, to the device 1005-a, via the frequency band (e.g., allocated at 1005), based at least on the first set of filtered data tones and the second set of filtered data tones. In some cases, the device 1005-b may transmit, to the device 1005-a, a DFT-S waveform via the first edge subband and the second edge subband. In some examples, the device 1005-b may transmit, to the device 1005-a, an OFDM waveform via a central subband of the frequency band.

Additionally, or alternatively, the device 1005-*b* may transmit the one or more waveforms according to a comb structure, wherein transmitting one or more demodulation reference signals via a demodulation reference signal symbol is based at least in part on the comb structure At 1030, the device 1005-*a* may demodulate the one or more waveforms, from the device 1005-*b* at 1025, based at least on the first set of filtered data tones associated with the first edge subband and the second set of filtered data tones associated with the second edge subband (e.g., as described in greater detail with reference to FIGS. 6 and 8). As such, the first set of filtered data tones and the second set of filtered data tones may correspond to the at least one subband spectrum shaping filter. In some cases, the device 1005-*a* may demodulate the one or more waveforms based at least on the indication of the one or more filters (e.g., received at 1005 or at 1020), or the at least one estimated subband spectrum shaping filter. In some examples, the device 1005-*a* may perform an ICI equalization procedure, a mean square estimate procedure, or both, on the first set of filtered data tones and the second set of filtered data tones, to demodulate the one or more waveforms.

Although the control signaling transmission, data tone filtering, waveform generation, and waveform transmitting is described as being performed by the device 1005-*b* in the example illustrated in FIG. 10, the described techniques of data tone filtering and waveform generation based on the filtered data tones may be applied by either and used by any type of device, such as the device 1005-*a* (e.g., may be implemented by a transmitting network entity 105, or by a transmitting UE 115, or any other wireless device). The described techniques may thereby support improved communication reliability, improved throughput, and reduced complexity by supporting spectrum shaping for spectrum confinement.

Figure 11:
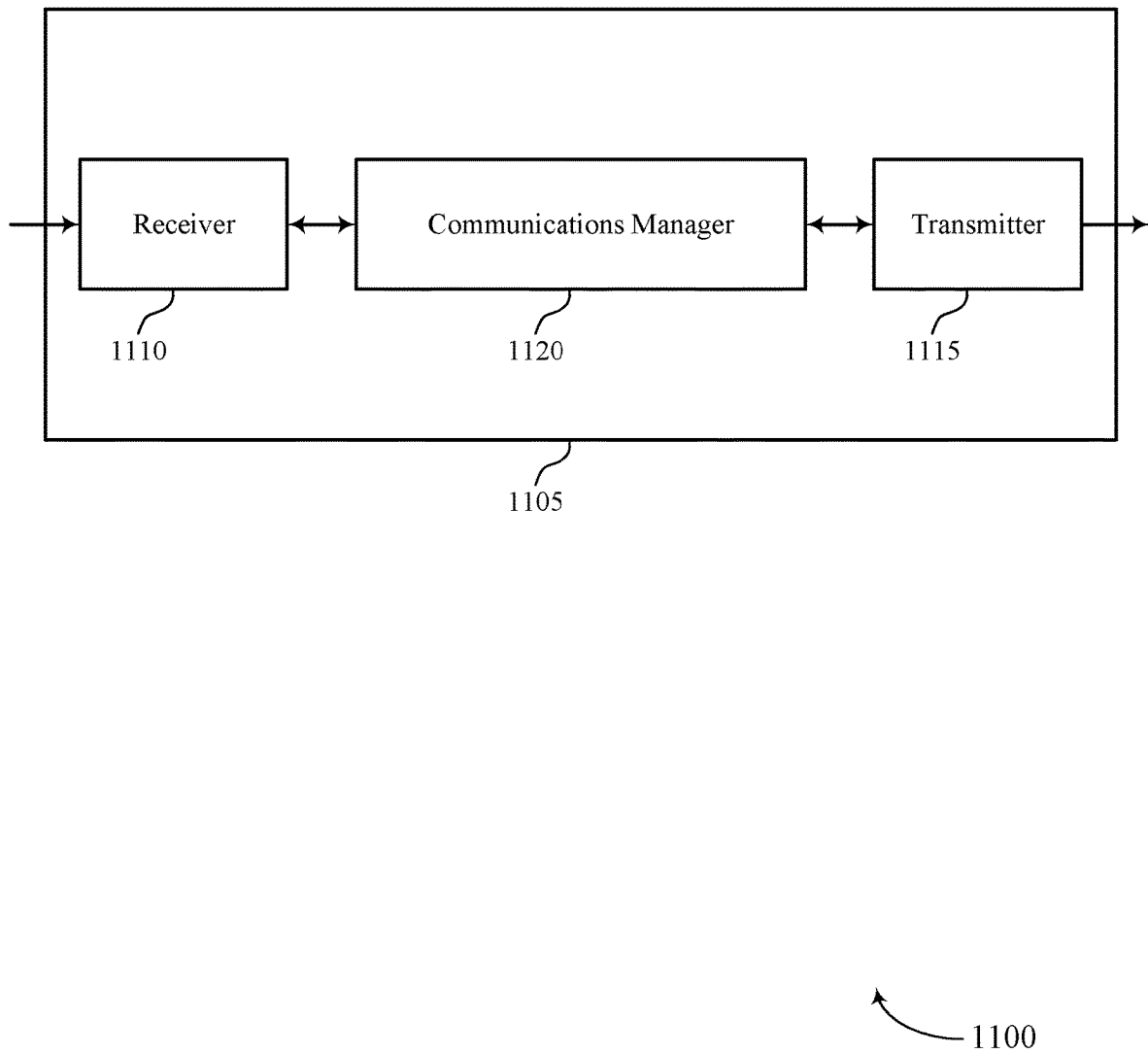
FIGS. 11 and 12 illustrate block diagrams of devices that support spectrum shaping and subband spectrum shaping for tight spectrum confinement and transceiver structure in accordance with one or more aspects of the present disclosure.

FIG. 11 illustrates a block diagram 1100 of a device 1105 that supports spectrum shaping and subband spectrum shaping for tight spectrum confinement and transceiver structure in accordance with one or more aspects of the present disclosure. The device 1105 may be an example of aspects of a transmitting wireless device as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to spectrum shaping and subband spectrum shaping for tight spectrum confinement and transceiver structure). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to spectrum shaping and subband spectrum shaping for tight spectrum confinement and transceiver structure). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of spectrum shaping and subband spectrum shaping for tight spectrum confinement and transceiver structure as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a transmitting device in accordance with examples as disclosed herein. For example, the communications manager 1120 may be configured as or otherwise support a means for communicating control signaling indicating an allocation of a frequency band having a first edge subband and a second edge subband. The communications manager 1120 may be configured as or otherwise support a means for generating a first set of filtered data tones associated with the first edge subband and a second set of filtered data tones associated with the second edge subband using at least one subband spectrum shaping filter. The communications manager 1120 may be configured as or otherwise support a means for transmitting one or more waveforms via the frequency band based on the first set of filtered data tones and the second set of filtered data tones.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for subband filtering resulting in increased throughput, decreased noise and interference, more reliable transmissions, and improved user experience.

Figure 12:
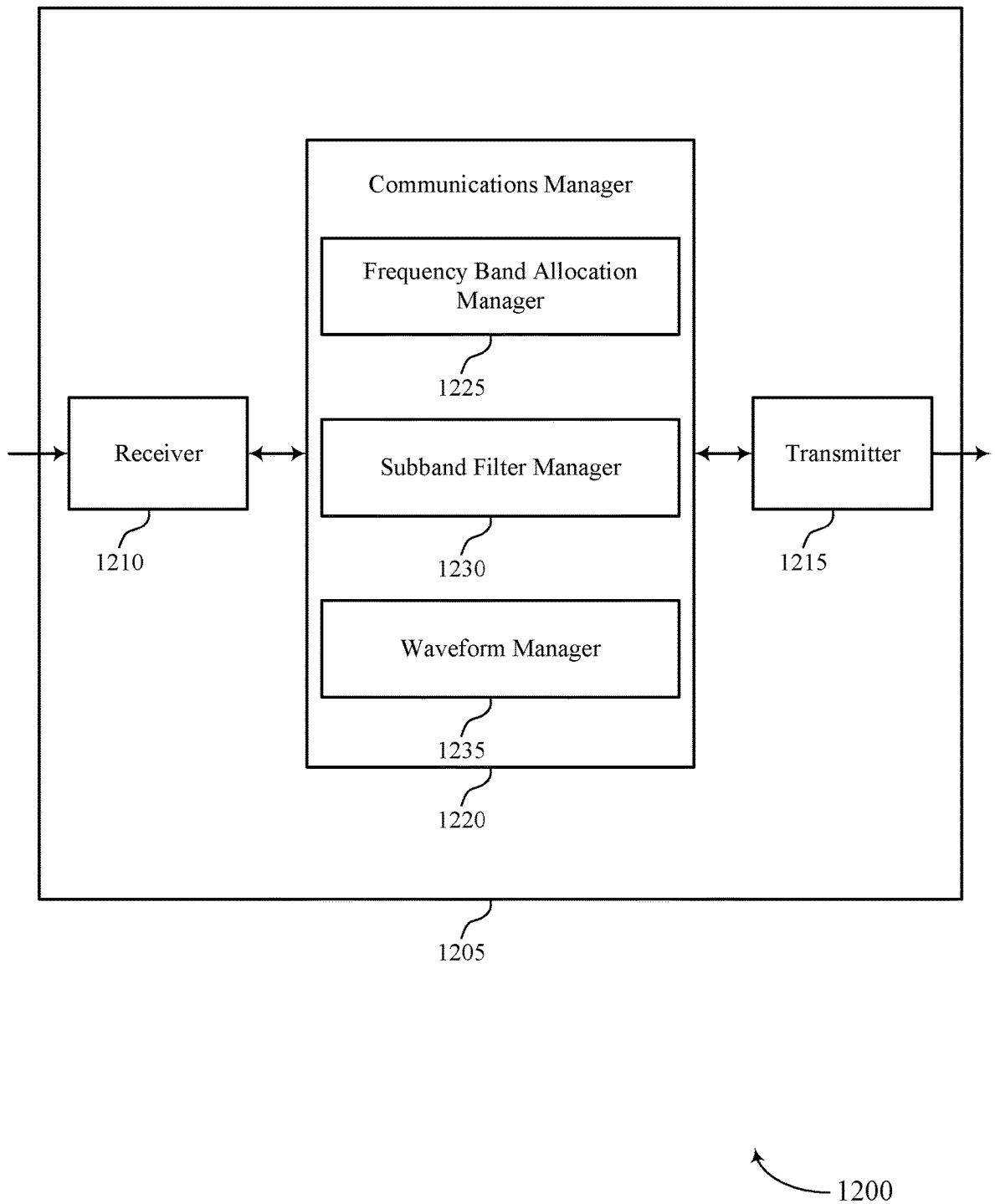

FIG. 12 illustrates a block diagram 1200 of a device 1205 that supports spectrum shaping and subband spectrum shaping for tight spectrum confinement and transceiver structure in accordance with one or more aspects of the present disclosure. The device 1205 may be an example of aspects of a device 1105 or a transmitting wireless device (e.g., a UE 115 or a network entity 105) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to spectrum shaping and subband spectrum shaping for tight spectrum confinement and transceiver structure). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to spectrum shaping and subband spectrum shaping for tight spectrum confinement and transceiver structure). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of spectrum shaping and subband spectrum shaping for tight spectrum confinement and transceiver structure as described herein. For example, the communications manager 1220 may include a frequency band allocation manager 1225, a subband filter manager 1230, a waveform manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a transmitting device in accordance with examples as disclosed herein. The frequency band allocation manager 1225 may be configured as or otherwise support a means for communicating control signaling indicating an allocation of a frequency band having a first edge subband and a second edge subband. The subband filter manager 1230 may be configured as or otherwise support a means for generating a first set of filtered data tones associated with the first edge subband and a second set of filtered data tones associated with the second edge subband using at least one subband spectrum shaping filter. The waveform manager 1235 may be configured as or otherwise support a means for transmitting one or more waveforms via the frequency band based on the first set of filtered data tones and the second set of filtered data tones.

Figure 13:
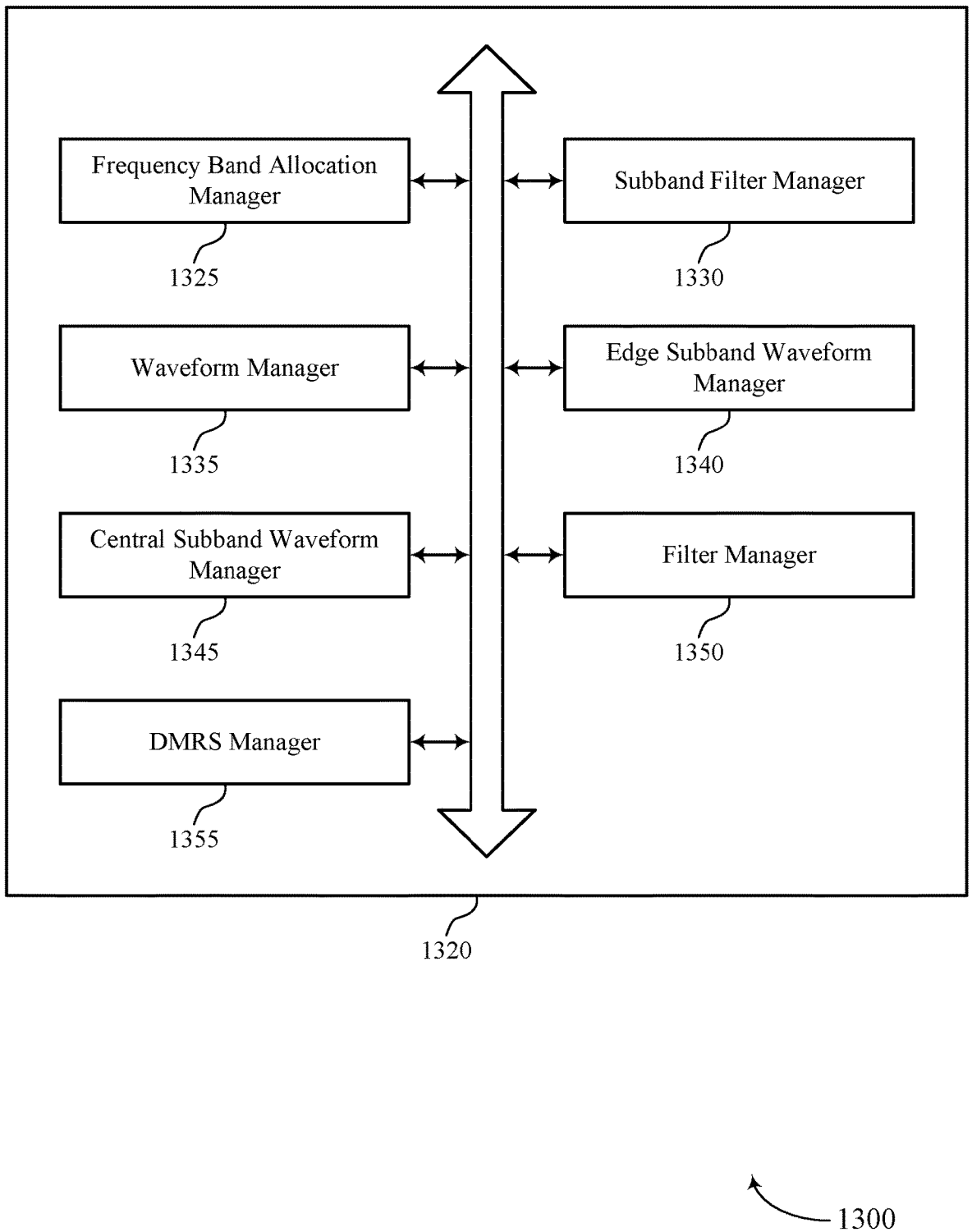
FIG. 13 illustrates a block diagram of a communications manager that supports spectrum shaping and subband spectrum shaping for tight spectrum confinement and transceiver structure in accordance with one or more aspects of the present disclosure.

FIG. 13 illustrates a block diagram 1300 of a communications manager 1320 that supports spectrum shaping and subband spectrum shaping for tight spectrum confinement and transceiver structure in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of spectrum shaping and subband spectrum shaping for tight spectrum confinement and transceiver structure as described herein. For example, the communications manager 1320 may include a frequency band allocation manager 1325, a subband filter manager 1330, a waveform manager 1335, an edge subband waveform manager 1340, a central subband waveform manager 1345, a filter manager 1350, a DMRS manager 1355, or any combination thereof. Each of these components may communicate, directly or indirectly, with one another (e.g., via one or more buses).

The communications manager 1320 may support wireless communications at a transmitting device in accordance with examples as disclosed herein. The frequency band allocation manager 1325 may be configured as or otherwise support a means for communicating control signaling indicating an allocation of a frequency band having a first edge subband and a second edge subband. The subband filter manager 1330 may be configured as or otherwise support a means for generating a first set of filtered data tones associated with the first edge subband and a second set of filtered data tones associated with the second edge subband using at least one subband spectrum shaping filter. The waveform manager 1335 may be configured as or otherwise support a means for transmitting one or more waveforms via the frequency band based on the first set of filtered data tones and the second set of filtered data tones.

In some examples, to support transmitting the one or more waveforms, the edge subband waveform manager 1340 may be configured as or otherwise support a means for transmitting a discrete Fourier transform spread waveform via the first edge subband and the second edge subband. In some examples, to support transmitting the one or more waveforms, the central subband waveform manager 1345 may be configured as or otherwise support a means for transmitting an orthogonal frequency domain multiplexed waveform via a central subband of the frequency band.

In some examples, the filter manager 1350 may be configured as or otherwise support a means for transmitting, to a receiving device, an indication of one or more filters associated with the at least one subband spectrum shaping filter.

In some examples, the filter manager 1350 may be configured as or otherwise support a means for transmitting, to a receiving device, an indication of a bandwidth of the first edge subband, a bandwidth of the second edge subband, or both, associated with the at least one subband spectrum shaping filter.

In some examples, the DMRS manager 1355 may be configured as or otherwise support a means for transmitting the one or more waveforms according to a comb structure, where transmitting one or more demodulation reference signals via a demodulation reference signal symbol is based on the comb structure.

In some examples, to support generating the first set of filtered data tones and the second set of filtered data tones, the filter manager 1350 may be configured as or otherwise support a means for applying a first subband spectrum shaping filter to a first set of data tones associated with the first edge subband to generate the first set of filtered data tones. In some examples, to support generating the first set of filtered data tones and the second set of filtered data tones, the filter manager 1350 may be configured as or otherwise support a means for applying a second subband spectrum shaping filter to a second set of data tones associated with the second edge subband to generate the second set of filtered data tones.

In some examples, the filter manager 1350 may be configured as or otherwise support a means for applying one or more filters to a third set of data tones that are associated with one or more center subbands of the frequency band.

In some examples, to support applying the first subband spectrum shaping filter, the filter manager 1350 may be configured as or otherwise support a means for convolving the first set of data tones with the first subband spectrum shaping filter to generate the first set of filtered data tones to generate the first set of filtered data tones, and where applying the second subband spectrum shaping filter includes. In some examples, to support applying the first subband spectrum shaping filter, the filter manager 1350 may be configured as or otherwise support a means for convolving the second set of data tones with the second subband spectrum shaping filter to generate the second set of filtered data tones.

Figure 14:
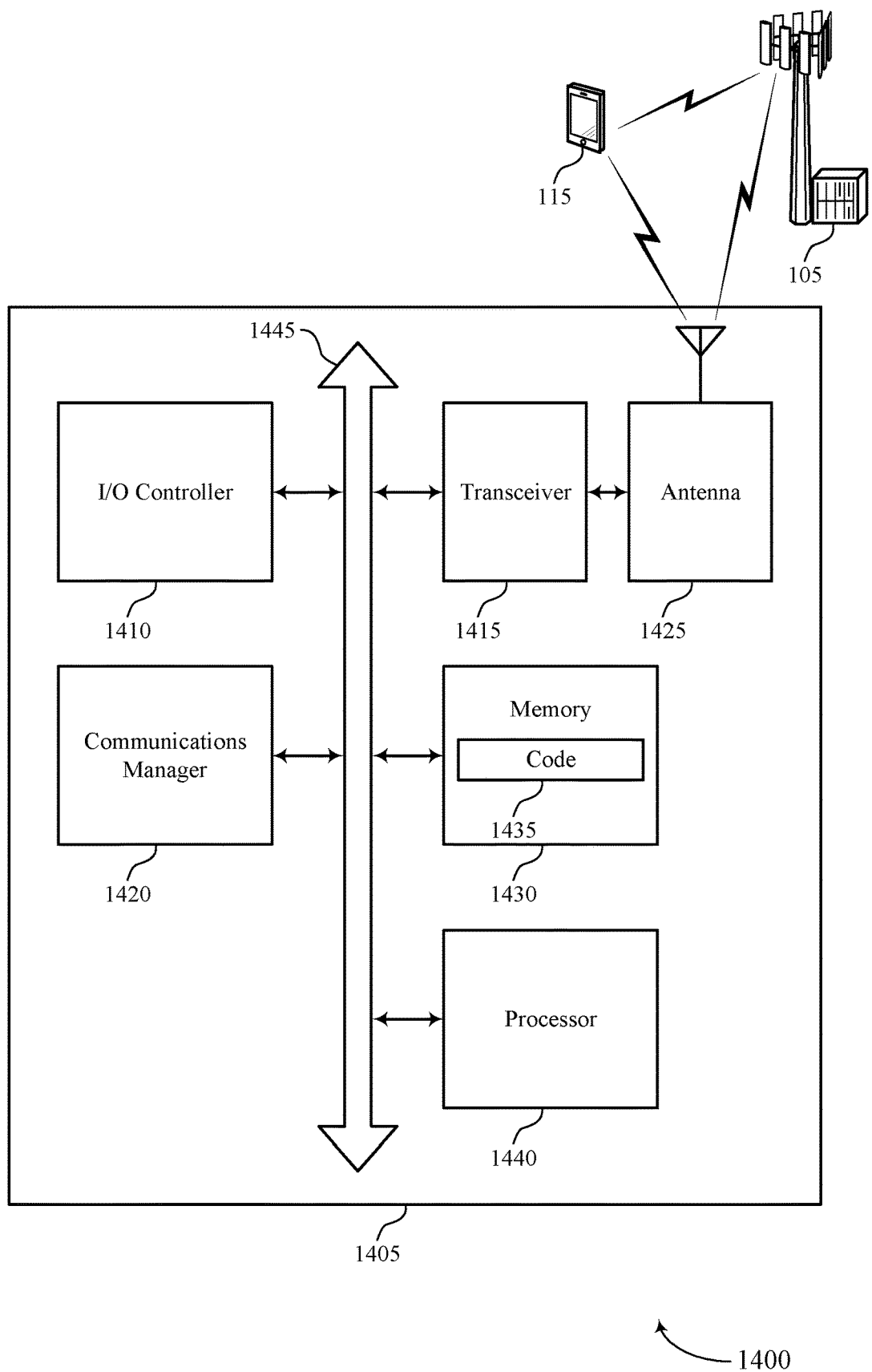
FIG. 14 illustrates a diagram of a system including a device that supports spectrum shaping and subband spectrum shaping for tight spectrum confinement and transceiver structure in accordance with one or more aspects of the present disclosure.

FIG. 14 illustrates a diagram of a system 1400 including a device 1405 that supports spectrum shaping and subband spectrum shaping for tight spectrum confinement and transceiver structure in accordance with one or more aspects of the present disclosure. The device 1405 may be an example of or include the components of a device 1105, a device 1205, or a transmitting wireless device as described herein. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting spectrum shaping and subband spectrum shaping for tight spectrum confinement and transceiver structure). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a transmitting device in accordance with examples as disclosed herein. For example, the communications manager 1420 may be configured as or otherwise support a means for communicating control signaling indicating an allocation of a frequency band having a first edge subband and a second edge subband. The communications manager 1420 may be configured as or otherwise support a means for generating a first set of filtered data tones associated with the first edge subband and a second set of filtered data tones associated with the second edge subband using at least one subband spectrum shaping filter. The communications manager 1420 may be configured as or otherwise support a means for transmitting one or more waveforms via the frequency band based on the first set of filtered data tones and the second set of filtered data tones.

By including or configuring the communications manager 1420 in accordance with examples as described herein, the device 1405 may support techniques for subband filtering resulting in increased throughput, decreased noise and interference, more reliable transmissions, more efficient utilization of system resources, decreased processing expenditures, and improved user experience.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of spectrum shaping and subband spectrum shaping for tight spectrum confinement and transceiver structure as described herein, or the processor 1440 and the memory 1430 may be otherwise configured to perform or support such operations.

Figure 15:
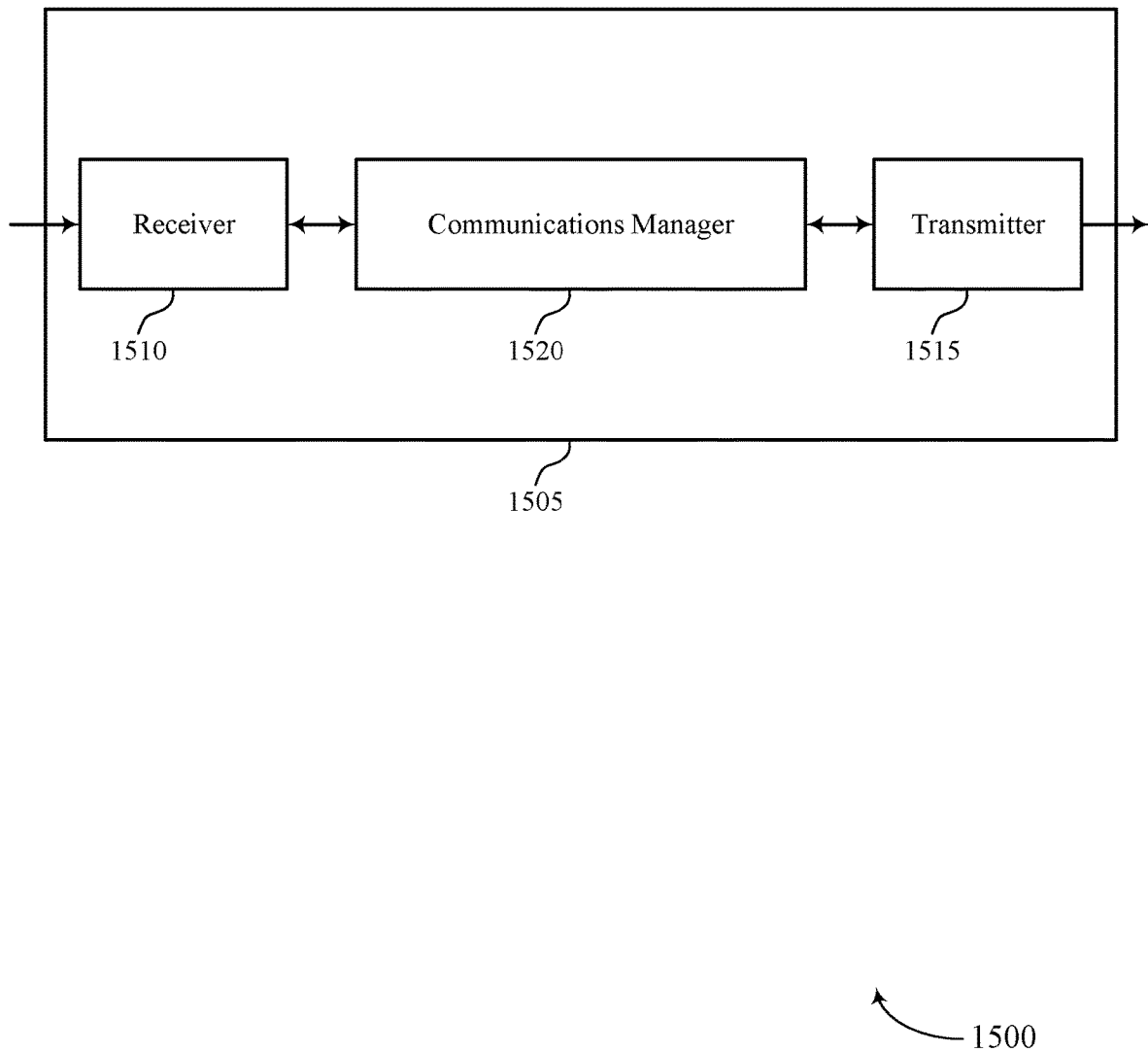
FIGS. 15 and 16 illustrate block diagrams of devices that support spectrum shaping and subband spectrum shaping for tight spectrum confinement and transceiver structure in accordance with one or more aspects of the present disclosure.

FIG. 15 illustrates a block diagram 1500 of a device 1505 that supports spectrum shaping and subband spectrum shaping for tight spectrum confinement and transceiver structure in accordance with one or more aspects of the present disclosure. The device 1505 may be an example of aspects of a receiving wireless device as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The communications manager 1520, the receiver 1510, the transmitter 1515, or various combinations thereof or various components thereof may be examples of means for performing various aspects of spectrum shaping and subband spectrum shaping for tight spectrum confinement and transceiver structure as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a receiving device in accordance with examples as disclosed herein. For example, the communications manager 1520 may be configured as or otherwise support a means for communicating control signaling indicating an allocation of a frequency band having a first edge subband and a second edge subband. The communications manager 1520 may be configured as or otherwise support a means for receiving one or more waveforms via the frequency band. The communications manager 1520 may be configured as or otherwise support a means for demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for subband filtering resulting in increased throughput, decreased noise and interference, more reliable transmissions, and improved user experience.

Figure 16:
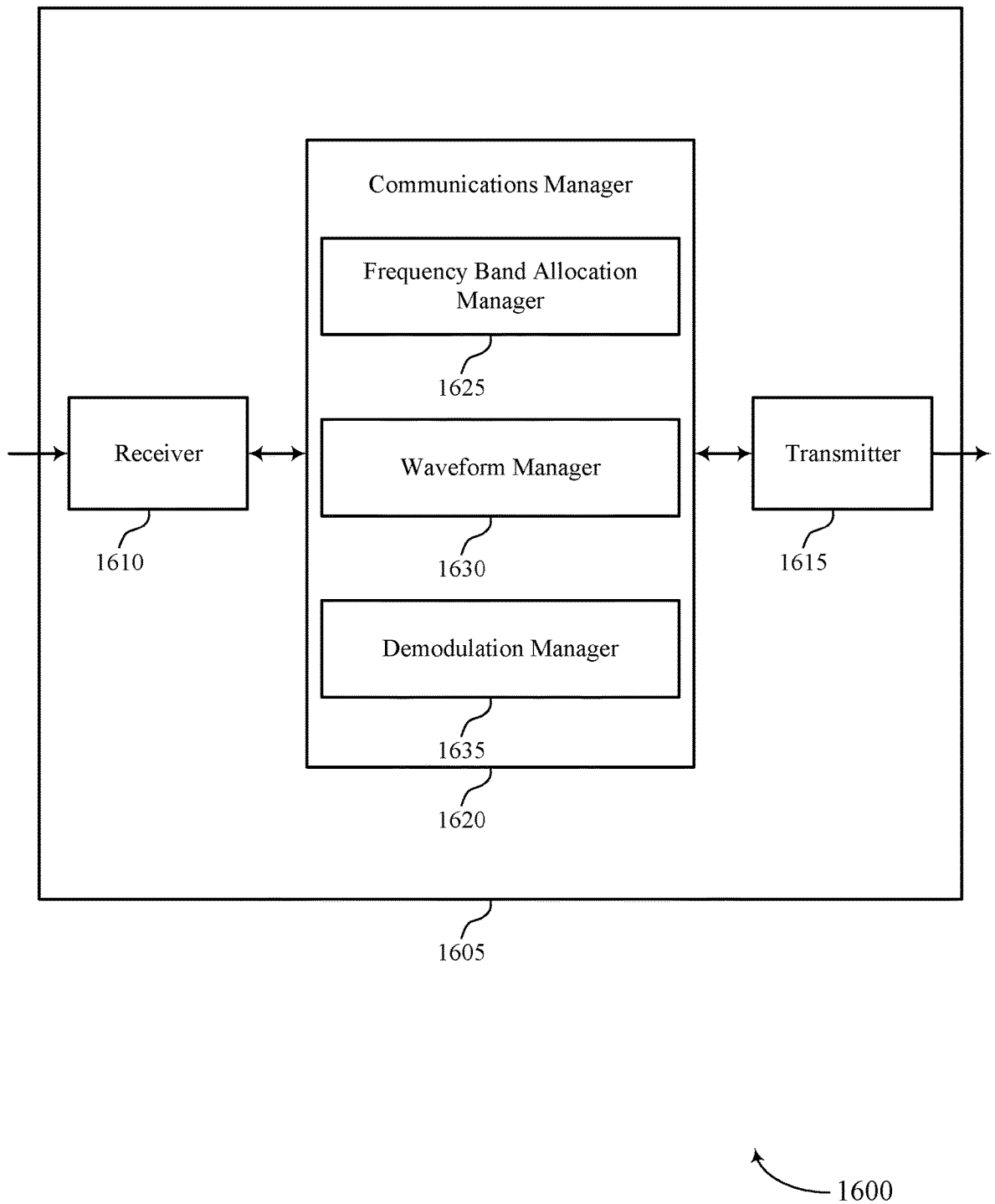

FIG. 16 illustrates a block diagram 1600 of a device 1605 that supports spectrum shaping and subband spectrum shaping for tight spectrum confinement and transceiver structure in accordance with one or more aspects of the present disclosure. The device 1605 may be an example of aspects of a device 1505 or a receiving wireless device (e.g., a UE 115 or a network entity 105) as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas. Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

The device 1605, or various components thereof, may be an example of means for performing various aspects of spectrum shaping and subband spectrum shaping for tight spectrum confinement and transceiver structure as described herein. For example, the communications manager 1620 may include a frequency band allocation manager 1625, a waveform manager 1630, a demodulation manager 1635, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communications at a receiving device in accordance with examples as disclosed herein. The frequency band allocation manager 1625 may be configured as or otherwise support a means for communicating control signaling indicating an allocation of a frequency band having a first edge subband and a second edge subband. The waveform manager 1630 may be configured as or otherwise support a means for receiving one or more waveforms via the frequency band. The demodulation manager 1635 may be configured as or otherwise support a means for demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

Figure 17:
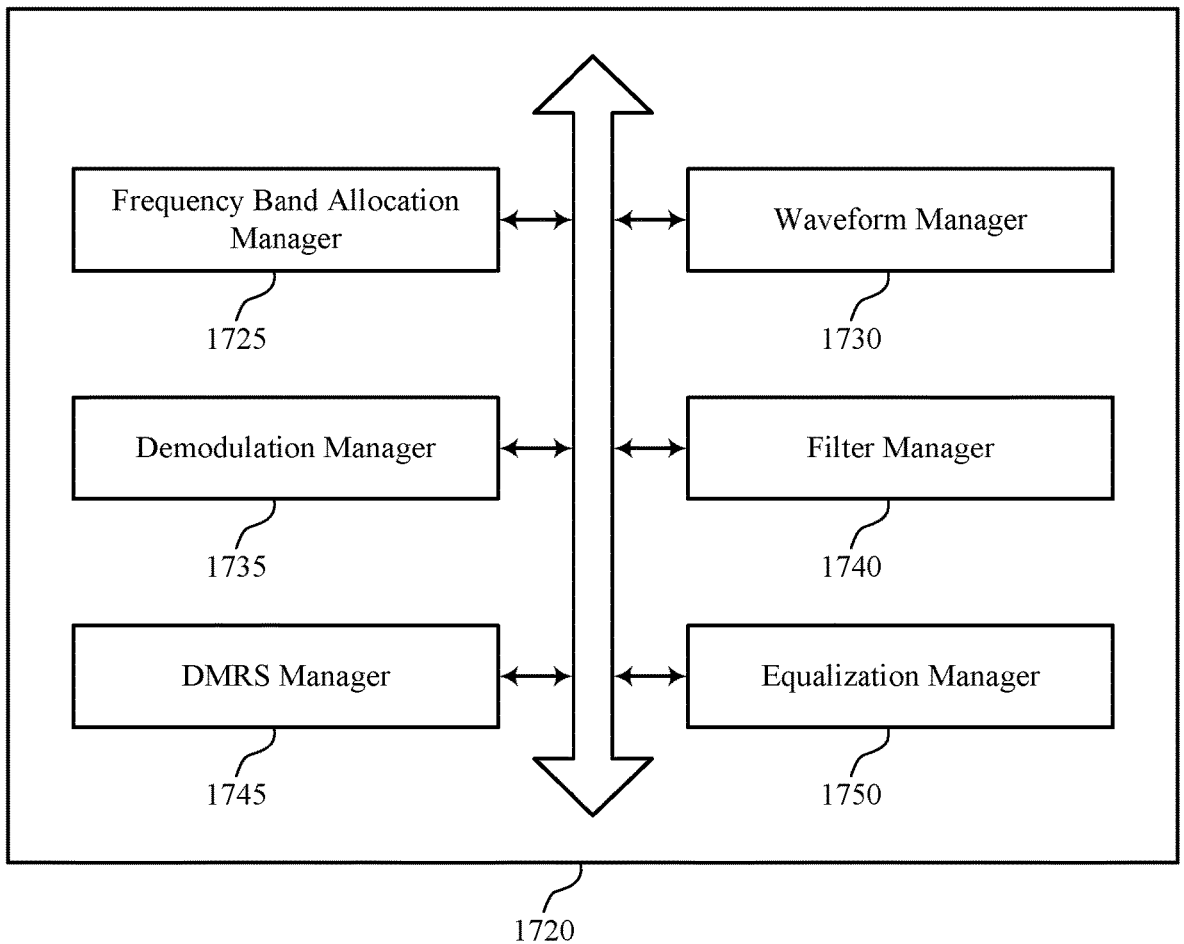
FIG. 17 illustrates a block diagram of a communications manager that supports spectrum shaping and subband spectrum shaping for tight spectrum confinement and transceiver structure in accordance with one or more aspects of the present disclosure.

FIG. 17 illustrates a block diagram 1700 of a communications manager 1720 that supports spectrum shaping and subband spectrum shaping for tight spectrum confinement and transceiver structure in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of spectrum shaping and subband spectrum shaping for tight spectrum confinement and transceiver structure as described herein. For example, the communications manager 1720 may include a frequency band allocation manager 1725, a waveform manager 1730, a demodulation manager 1735, a filter manager 1740, a DMRS manager 1745, an equalization manager 1750, or any combination thereof. Each of these components may communicate, directly or indirectly, with one another (e.g., via one or more buses).

The communications manager 1720 may support wireless communications at a receiving device in accordance with examples as disclosed herein. The frequency band allocation manager 1725 may be configured as or otherwise support a means for communicating control signaling indicating an allocation of a frequency band having a first edge subband and a second edge subband. The waveform manager 1730 may be configured as or otherwise support a means for receiving one or more waveforms via the frequency band. The demodulation manager 1735 may be configured as or otherwise support a means for demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

In some examples, to support receiving the one or more waveforms, the waveform manager 1730 may be configured as or otherwise support a means for receiving a discrete Fourier transform spread waveform via the first edge subband and the second edge subband. In some examples, to support receiving the one or more waveforms, the waveform manager 1730 may be configured as or otherwise support a means for receiving an orthogonal frequency domain multiplexed waveform via a central subband of the frequency band.

In some examples, the filter manager 1740 may be configured as or otherwise support a means for receiving, from a transmitting device, an indication of one or more filters associated with the at least one subband spectrum shaping filter, where demodulating the one or more waveforms is based on the indication of the one or more filters.

In some examples, the frequency band allocation manager 1725 may be configured as or otherwise support a means for receiving, from the transmitting device, an indication of a bandwidth of the first edge subband, a bandwidth of the second edge subband, or both, associated with the at least one subband spectrum shaping filter.

In some examples, the DMRS manager 1745 may be configured as or otherwise support a means for receiving, from a transmitting device, the one or more waveforms according to a comb structure, where receiving one or more demodulation reference signals via a demodulation reference signal symbol is based on the comb structure.

In some examples, the filter manager 1740 may be configured as or otherwise support a means for estimating the at least one subband spectrum shaping filter based on the demodulation reference signal comb structure, where demodulating the one or more waveforms is based on the at least one estimated subband spectrum shaping filter.

In some examples, to support demodulating the one or more waveforms, the equalization manager 1750 may be configured as or otherwise support a means for performing an inter-carrier interference equalization procedure on the first set of filtered data tones and the second set of filtered data tones.

In some examples, to support demodulating the one or more waveforms, the demodulation manager 1735 may be configured as or otherwise support a means for performing a mean square estimate procedure on the first set of filtered data tones and the second set of filtered data tones.

Figure 18:
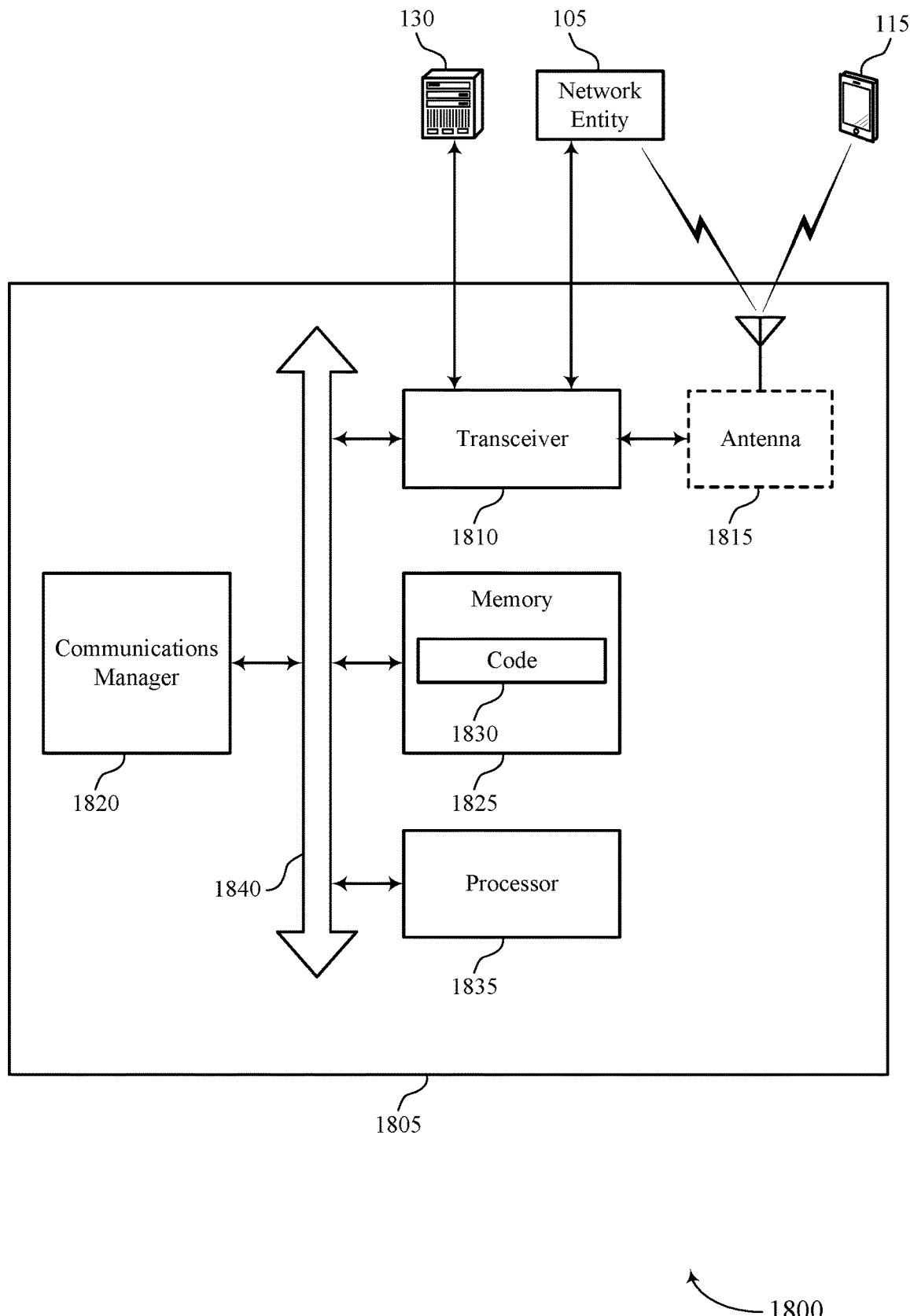
FIG. 18 illustrates a diagram of a system including a device that supports spectrum shaping and subband spectrum shaping for tight spectrum confinement and transceiver structure in accordance with one or more aspects of the present disclosure.

FIG. 18 illustrates a diagram of a system 1800 including a device 1805 that supports spectrum shaping and subband spectrum shaping for tight spectrum confinement and transceiver structure in accordance with one or more aspects of the present disclosure. The device 1805 may be an example of or include the components of a device 1505, a device 1605, or a receiving wireless device as described herein. The device 1805 may include components for bi-directional voice and data communications including components for transmitting and receiving communications, such as a communications manager 1820, a transceiver 1810, an antenna 1815, a memory 1825, code 1830, and a processor 1835. These components may be in electronic communication or otherwise coupled (e.g., operatively, communicatively, functionally, electronically, electrically) via one or more buses (e.g., a bus 1840).

The transceiver 1810 may support bi-directional communications via wired links, wireless links, or both as described herein. In some examples, the transceiver 1810 may include a wired transceiver and may communicate bi-directionally with another wired transceiver. Additionally, or alternatively, in some examples, the transceiver 1810 may include a wireless transceiver and may communicate bi-directionally with another wireless transceiver. In some examples, the device 1805 may include one or more antennas 1815, which may be capable of transmitting or receiving wireless transmissions (e.g., concurrently). The transceiver 1810 may also include a modem to modulate signals, to provide the modulated signals for transmission (e.g., by one or more antennas 1815, by a wired transmitter), to receive modulated signals (e.g., from one or more antennas 1815, from a wired receiver), and to demodulate signals. In some implementations, the transceiver 1810 may include one or more interfaces, such as one or more interfaces coupled with the one or more antennas 1815 that are configured to support various receiving or obtaining operations, or one or more interfaces coupled with the one or more antennas 1815 that are configured to support various transmitting or outputting operations, or a combination thereof. In some implementations, the transceiver 1810 may include or be configured for coupling with one or more processors or memory components that are operable to perform or support operations based on received or obtained information or signals, or to generate information or other signals for transmission or other outputting, or any combination thereof. In some implementations, the transceiver 1810, or the transceiver 1810 and the one or more antennas 1815, or the transceiver 1810 and the one or more antennas 1815 and one or more processors or memory components (for example, the processor 1835, or the memory 1825, or both), may be included in a chip or chip assembly that is installed in the device 1805. In some examples, the transceiver may be operable to support communications via one or more communications links (e.g., a communication link 125, a backhaul communication link 120, a midhaul communication link 162, a fronthaul communication link 168).

The memory 1825 may include RAM and ROM. The memory 1825 may store computer-readable, computer-executable code 1830 including instructions that, when executed by the processor 1835, cause the device 1805 to perform various functions described herein. The code 1830 may be stored in a non-transitory computer-readable medium such as system memory or another type of memory. In some cases, the code 1830 may not be directly executable by the processor 1835 but may cause a computer (e.g., when compiled and executed) to perform functions described herein. In some cases, the memory 1825 may contain, among other things, a BIOS which may control basic hardware or software operation such as the interaction with peripheral components or devices.

The processor 1835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1835 may be configured to operate a memory array using a memory controller. In some other cases, a memory controller may be integrated into the processor 1835. The processor 1835 may be configured to execute computer-readable instructions stored in a memory (e.g., the memory 1825) to cause the device 1805 to perform various functions (e.g., functions or tasks supporting spectrum shaping and subband spectrum shaping for tight spectrum confinement and transceiver structure). For example, the device 1805 or a component of the device 1805 may include a processor 1835 and memory 1825 coupled with the processor 1835, the processor 1835 and memory 1825 configured to perform various functions described herein. The processor 1835 may be an example of a cloud-computing platform (e.g., one or more physical nodes and supporting software such as operating systems, virtual machines, or container instances) that may host the functions (e.g., by executing code 1830) to perform the functions of the device 1805. The processor 1835 may be any one or more suitable processors capable of executing scripts or instructions of one or more software programs stored in the device 1805 (such as within the memory 1825). In some implementations, the processor 1835 may be a component of a processing system. A processing system may generally refer to a system or series of machines or components that receives inputs and processes the inputs to produce a set of outputs (which may be passed to other systems or components of, for example, the device 1805). For example, a processing system of the device 1805 may refer to a system including the various other components or subcomponents of the device 1805, such as the processor 1835, or the transceiver 1810, or the communications manager 1820, or other components or combinations of components of the device 1805. The processing system of the device 1805 may interface with other components of the device 1805, and may process information received from other components (such as inputs or signals) or output information to other components. For example, a chip or modem of the device 1805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1805 may transmit information output from the chip or modem. Additionally, or alternatively, in some implementations, the one or more interfaces may refer to an interface between the processing system of the chip or modem and a receiver, such that the device 1805 may obtain information or signal inputs, and the information may be passed to the processing system. A person having ordinary skill in the art will readily recognize that a first interface also may obtain information or signal inputs, and a second interface also may output information or signal outputs.

In some examples, a bus 1840 may support communications of (e.g., within) a protocol layer of a protocol stack. In some examples, a bus 1840 may support communications associated with a logical channel of a protocol stack (e.g., between protocol layers of a protocol stack), which may include communications performed within a component of the device 1805, or between different components of the device 1805 that may be co-located or located in different locations (e.g., where the device 1805 may refer to a system in which one or more of the communications manager 1820, the transceiver 1810, the memory 1825, the code 1830, and the processor 1835 may be located in one of the different components or divided between different components).

In some examples, the communications manager 1820 may manage aspects of communications with a core network 130 (e.g., via one or more wired or wireless backhaul links). For example, the communications manager 1820 may manage the transfer of data communications for client devices, such as one or more UEs 115. In some examples, the communications manager 1820 may manage communications with other network entities 105, and may include a controller or scheduler for controlling communications with UEs 115 in cooperation with other network entities 105. In some examples, the communications manager 1820 may support an X2 interface within an LTE/LTE-A wireless communications network technology to provide communication between network entities 105.

The communications manager 1820 may support wireless communications at a receiving device in accordance with examples as disclosed herein. For example, the communications manager 1820 may be configured as or otherwise support a means for communicating control signaling indicating an allocation of a frequency band having a first edge subband and a second edge subband. The communications manager 1820 may be configured as or otherwise support a means for receiving one or more waveforms via the frequency band. The communications manager 1820 may be configured as or otherwise support a means for demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter.

By including or configuring the communications manager 1820 in accordance with examples as described herein, the device 1805 may support techniques for subband filtering resulting in increased throughput, decreased noise and interference, more reliable transmissions, more efficient utilization of system resources, decreased processing expenditures, and improved user experience.

In some examples, the communications manager 1820 may be configured to perform various operations (e.g., receiving, obtaining, monitoring, outputting, transmitting) using or otherwise in cooperation with the transceiver 1810, the one or more antennas 1815 (e.g., where applicable), or any combination thereof. Although the communications manager 1820 is illustrated as a separate component, in some examples, one or more functions described with reference to the communications manager 1820 may be supported by or performed by the transceiver 1810, the processor 1835, the memory 1825, the code 1830, or any combination thereof. For example, the code 1830 may include instructions executable by the processor 1835 to cause the device 1805 to perform various aspects of spectrum shaping and subband spectrum shaping for tight spectrum confinement and transceiver structure as described herein, or the processor 1835 and the memory 1825 may be otherwise configured to perform or support such operations.

Figure 19:
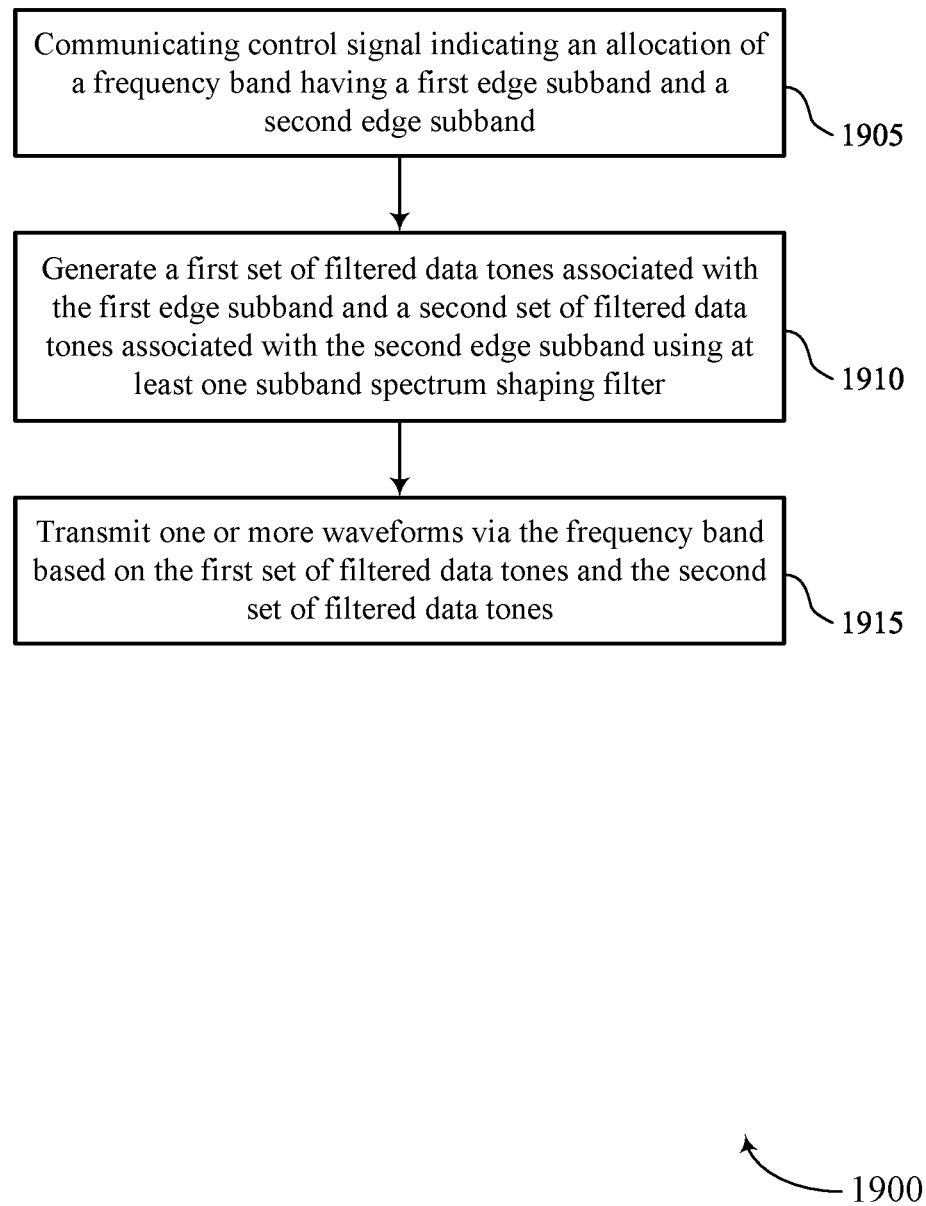
FIGS. 19 through 22 illustrate flowcharts showing methods that support spectrum shaping and subband spectrum shaping for tight spectrum confinement and transceiver structure in accordance with one or more aspects of the present disclosure.

FIG. 19 illustrates a flowchart illustrating a method 1900 that supports spectrum shaping and subband spectrum shaping for tight spectrum confinement and transceiver structure in accordance with one or more aspects of the present disclosure. The operations of the method 1900 may be implemented by a transmitting wireless device or its components as described herein. For example, the operations of the method 1900 may be performed by a transmitting wireless device as described with reference to FIGS. 1 through 14. In some examples, a transmitting wireless device may execute a set of instructions to control the functional elements of the transmitting wireless device to perform the described functions. Additionally, or alternatively, the transmitting wireless device may perform aspects of the described functions using special-purpose hardware.

At 1905, the method may include communicating control signaling indicating an allocation of a frequency band having a first edge subband and a second edge subband. The operations of 1905 may be performed in accordance with examples as disclosed herein. In some examples, aspects of the operations of 1905 may be performed by a frequency band allocation manager 1325 as described with reference to FIG. 13.

At 1910, the method may include generating a first set of filtered data tones associated with the first edge subband and a second set of filtered data tones associated with the second edge subband using at least one subband spectrum shaping filter. The operations of 1910 may be performed in accordance with examples as disclosed herein. In some examples, aspects of the operations of 1910 may be performed by a subband filter manager 1330 as described with reference to FIG. 13.

At 1915, the method may include transmitting one or more waveforms via the frequency band based on the first set of filtered data tones and the second set of filtered data tones. The operations of 1915 may be performed in accordance with examples as disclosed herein. In some examples, aspects of the operations of 1915 may be performed by a waveform manager 1335 as described with reference to FIG. 13.

Figure 20:
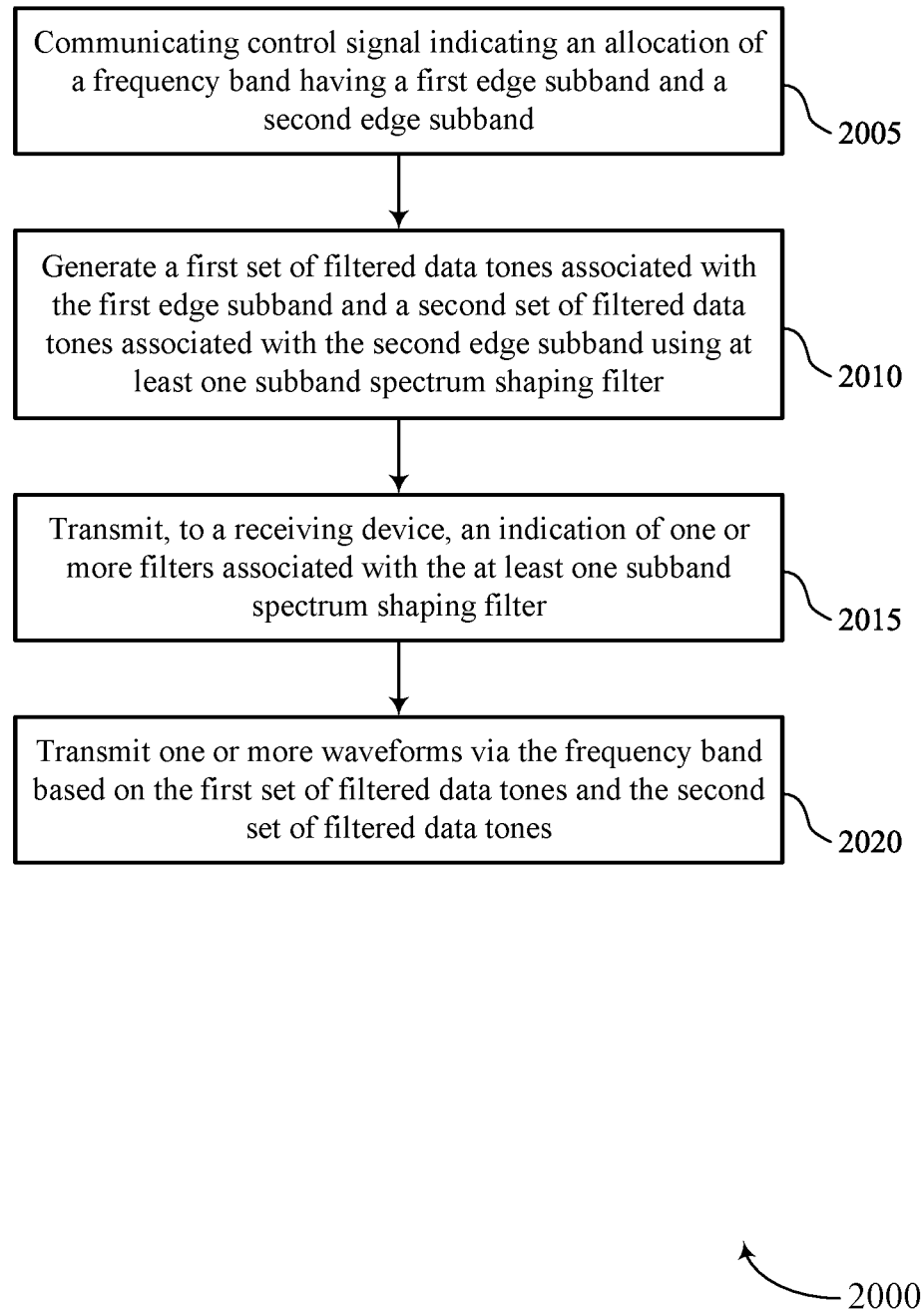

FIG. 20 illustrates a flowchart illustrating a method 2000 that supports spectrum shaping and subband spectrum shaping for tight spectrum confinement and transceiver structure in accordance with one or more aspects of the present disclosure. The operations of the method 2000 may be implemented by a transmitting wireless device or its components as described herein. For example, the operations of the method 2000 may be performed by a transmitting wireless device as described with reference to FIGS. 1 through 14. In some examples, a transmitting wireless device may execute a set of instructions to control the functional elements of the transmitting wireless device to perform the described functions. Additionally, or alternatively, the transmitting wireless device may perform aspects of the described functions using special-purpose hardware.

At 2005, the method may include communicating control signaling indicating an allocation of a frequency band having a first edge subband and a second edge subband. The operations of 2005 may be performed in accordance with examples as disclosed herein. In some examples, aspects of the operations of 2005 may be performed by a frequency band allocation manager 1325 as described with reference to FIG. 13.

At 2010, the method may include generating a first set of filtered data tones associated with the first edge subband and a second set of filtered data tones associated with the second edge subband using at least one subband spectrum shaping filter. The operations of 2010 may be performed in accordance with examples as disclosed herein. In some examples, aspects of the operations of 2010 may be performed by a subband filter manager 1330 as described with reference to FIG. 13.

At 2015, the method may include transmitting, to a receiving device, an indication of one or more filters associated with the at least one subband spectrum shaping filter. The operations of 2015 may be performed in accordance with examples as disclosed herein. In some examples, aspects of the operations of 2015 may be performed by a filter manager 1350 as described with reference to FIG. 13.

At 2020, the method may include transmitting one or more waveforms via the frequency band based on the first set of filtered data tones and the second set of filtered data tones. The operations of 2020 may be performed in accordance with examples as disclosed herein. In some examples, aspects of the operations of 2020 may be performed by a waveform manager 1335 as described with reference to FIG. 13.

Figure 21:
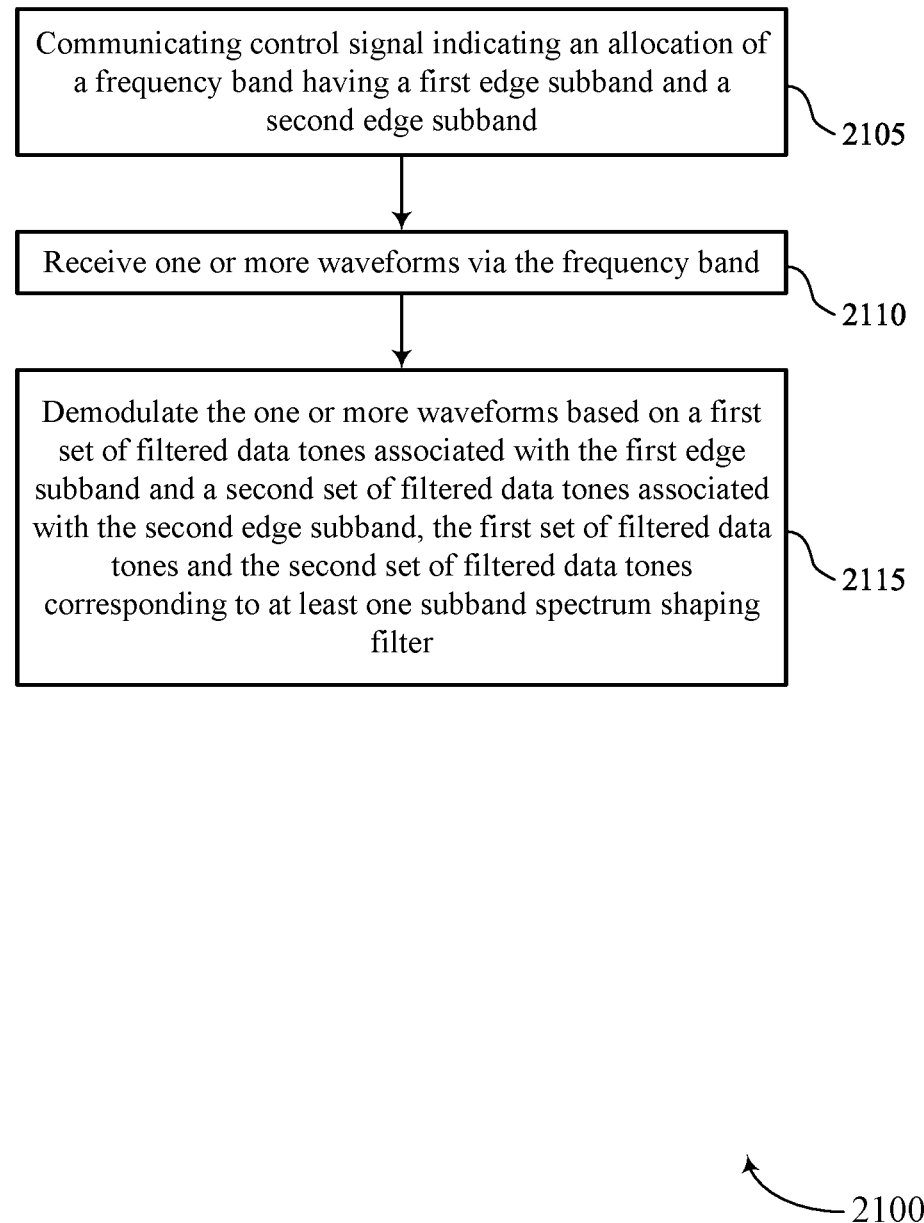

FIG. 21 illustrates a flowchart illustrating a method 2100 that supports spectrum shaping and subband spectrum shaping for tight spectrum confinement and transceiver structure in accordance with one or more aspects of the present disclosure. The operations of the method 2100 may be implemented by a receiving wireless device or its components as described herein. For example, the operations of the method 2100 may be performed by a receiving wireless device as described with reference to FIGS. 1 through 10 and 15 through 18. In some examples, a receiving wireless device may execute a set of instructions to control the functional elements of the receiving wireless device to perform the described functions. Additionally, or alternatively, the receiving wireless device may perform aspects of the described functions using special-purpose hardware.

At 2105, the method may include communicating control signaling indicating an allocation of a frequency band having a first edge subband and a second edge subband. The operations of 2105 may be performed in accordance with examples as disclosed herein. In some examples, aspects of the operations of 2105 may be performed by a frequency band allocation manager 1725 as described with reference to FIG. 17.

At 2110, the method may include receiving one or more waveforms via the frequency band. The operations of 2110 may be performed in accordance with examples as disclosed herein. In some examples, aspects of the operations of 2110 may be performed by a waveform manager 1730 as described with reference to FIG. 17.

At 2115, the method may include demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter. The operations of 2115 may be performed in accordance with examples as disclosed herein. In some examples, aspects of the operations of 2115 may be performed by a demodulation manager 1735 as described with reference to FIG. 17.

Figure 22:
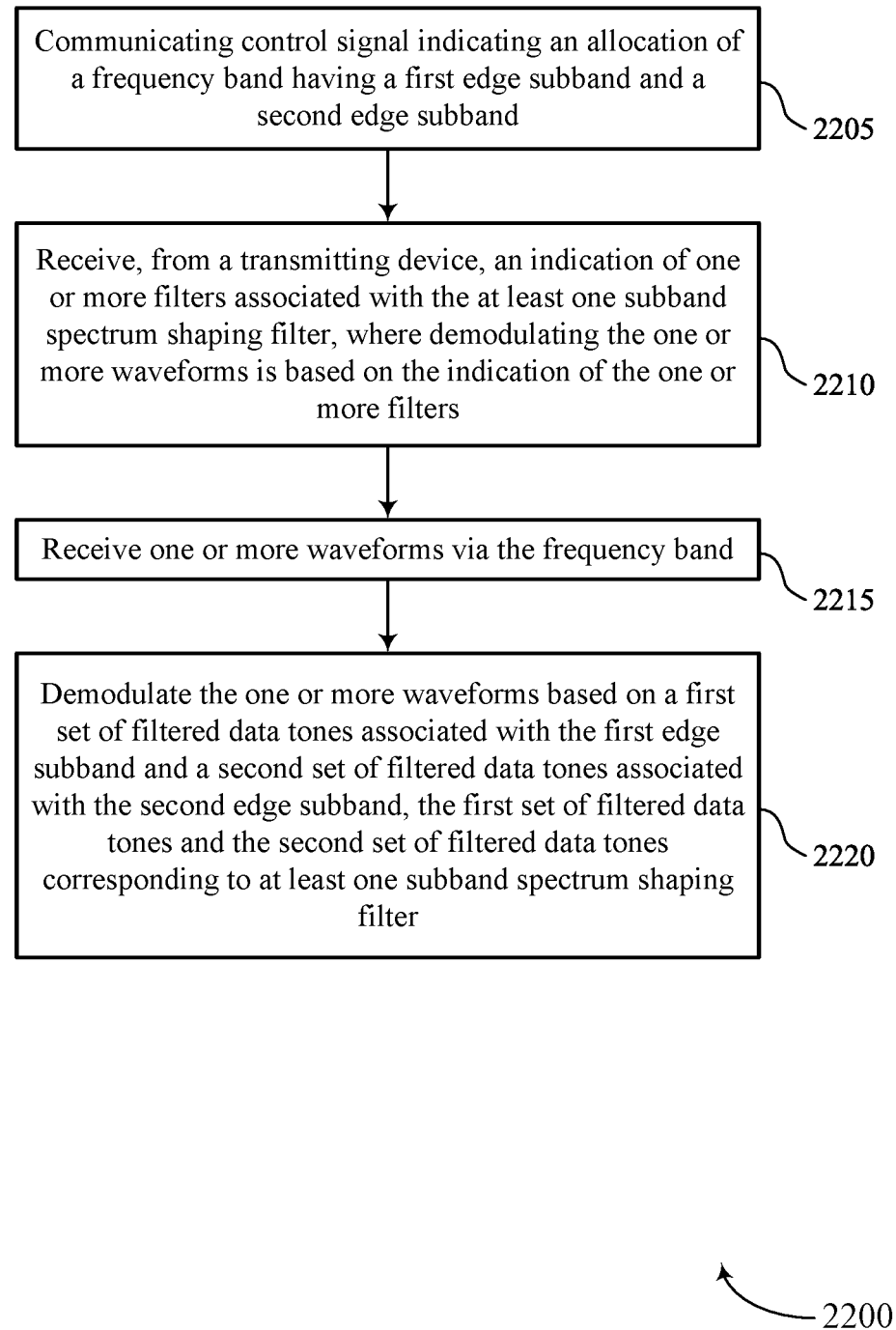

FIG. 22 illustrates a flowchart illustrating a method 2200 that supports spectrum shaping and subband spectrum shaping for tight spectrum confinement and transceiver structure in accordance with one or more aspects of the present disclosure. The operations of the method 2200 may be implemented by a receiving wireless device or its components as described herein. For example, the operations of the method 2200 may be performed by a receiving wireless device as described with reference to FIGS. 1 through 10 and 15 through 18. In some examples, a receiving wireless device may execute a set of instructions to control the functional elements of the receiving wireless device to perform the described functions. Additionally, or alternatively, the receiving wireless device may perform aspects of the described functions using special-purpose hardware.

At 2205, the method may include communicating control signaling indicating an allocation of a frequency band having a first edge subband and a second edge subband. The operations of 2205 may be performed in accordance with examples as disclosed herein. In some examples, aspects of the operations of 2205 may be performed by a frequency band allocation manager 1725 as described with reference to FIG. 17.

At 2210, the method may include receiving, from a transmitting device, an indication of one or more filters associated with the at least one subband spectrum shaping filter, where demodulating the one or more waveforms is based on the indication of the one or more filters. The operations of 2210 may be performed in accordance with examples as disclosed herein. In some examples, aspects of the operations of 2210 may be performed by a filter manager 1740 as described with reference to FIG. 17.

At 2215, the method may include receiving one or more waveforms via the frequency band. The operations of 2215 may be performed in accordance with examples as disclosed herein. In some examples, aspects of the operations of 2215 may be performed by a waveform manager 1730 as described with reference to FIG. 17.

At 2220, the method may include demodulating the one or more waveforms based on a first set of filtered data tones associated with the first edge subband and a second set of filtered data tones associated with the second edge subband, the first set of filtered data tones and the second set of filtered data tones corresponding to at least one subband spectrum shaping filter. The operations of 2220 may be performed in accordance with examples as disclosed herein. In some examples, aspects of the operations of 2220 may be performed by a demodulation manager 1735 as described with reference to FIG. 17.

The following provides an overview of aspects of the present disclosure:

Aspect 1: A method for wireless communications at a transmitting device, comprising: communicating control signaling indicating an allocation of a frequency band having a first edge subband and a second edge subband; generating a first set of filtered data tones associated with the first edge subband and a second set of filtered data tones associated with the second edge subband using at least one subband spectrum shaping filter; and transmitting one or more waveforms via the frequency band based at least in part on the first set of filtered data tones and the second set of filtered data tones.

Aspect 2: The method of aspect 1, wherein transmitting the one or more waveforms comprises: transmitting a DFT-S waveform via the first edge subband and the second edge subband; and transmitting an OFDM waveform via a central subband of the frequency band.

Aspect 3: The method of any of aspects 1 through 2, further comprising: transmitting, to a receiving device, an indication of one or more filters associated with the at least one subband spectrum shaping filter.

Aspect 4: The method of any of aspects 1 through 3, further comprising: transmitting, to a receiving device, an indication of a bandwidth of the first edge subband, a bandwidth of the second edge subband, or both, associated with the at least one subband spectrum shaping filter.

Aspect 5: The method of any of aspects 1 through 4, wherein transmitting the one or more waveforms further comprises: transmitting the one or more waveforms according to a comb structure, wherein transmitting one or more DMRSs via a DMRS symbol is based at least in part on the comb structure.

Aspect 6: The method of any of aspects 1 through 5, wherein generating the first set of filtered data tones and the second set of filtered data tones comprises: applying a first subband spectrum shaping filter to a first set of data tones associated with the first edge subband to generate the first set of filtered data tones; and applying a second subband spectrum shaping filter to a second set of data tones associated with the second edge subband to generate the second set of filtered data tones.

Aspect 7: The method of aspect 6, further comprising: applying one or more filters to a third set of data tones that are associated with one or more center subbands of the frequency band.

Aspect 8: The method of any of aspects 6 through 7, wherein applying the first subband spectrum shaping filter comprises: convolving the first set of data tones with the first subband spectrum shaping filter to generate the first set of filtered data tones to generate the first set of filtered data tones, and wherein applying the second subband spectrum shaping filter comprises: convolving the second set of data tones with the second subband spectrum shaping filter to generate the second set of filtered data tones.

Aspect 9: A method for wireless communications at a receiving device, comprising: communicating control signaling indicating an allocation of a frequency band having a first edge subband and a second edge subband; receiving one or more waveforms via the frequency band; and demodulating the one or more waveforms based at least in part on a first set of filtered data tones associated with the first edge subband and a second set of filtered data tones associated with the second edge subband, the first set of filtered data tones and the second set of filtered data tones corresponding to at least one subband spectrum shaping filter.

Aspect 10: The method of aspect 9, wherein receiving the one or more waveforms comprises: receiving a DFT-S waveform via the first edge subband and the second edge subband; and receiving an OFDM waveform via a central subband of the frequency band.

Aspect 11: The method of any of aspects 9 through 10, further comprising: receiving, from a transmitting device, an indication of one or more filters associated with the at least one subband spectrum shaping filter, wherein demodulating the one or more waveforms is based at least in part on the indication of the one or more filters.

Aspect 12: The method of aspect 11, further comprising: receiving, from the transmitting device, an indication of a bandwidth of the first edge subband, a bandwidth of the second edge subband, or both, associated with the at least one subband spectrum shaping filter.

Aspect 13: The method of any of aspects 9 through 12, wherein receiving the one or more waveforms further comprises: receiving, from a transmitting device, the one or more waveforms according to a comb structure, wherein receiving one or more DMRSs via a DMRS symbol is based at least in part on the comb structure.

Aspect 14: The method of aspect 13, further comprising: estimating the at least one subband spectrum shaping filter based at least in part on the DMRS comb structure, wherein demodulating the one or more waveforms is based at least in part on the at least one estimated subband spectrum shaping filter.

Aspect 15: The method of any of aspects 9 through 14, wherein demodulating the one or more waveforms comprises: performing an inter-carrier interference equalization procedure on the first set of filtered data tones and the second set of filtered data tones.

Aspect 16: The method of any of aspects 9 through 15, wherein demodulating the one or more waveforms comprises: performing a mean square estimate procedure on the first set of filtered data tones and the second set of filtered data tones.

Aspect 17: An apparatus for wireless communications at a transmitting device, comprising a processor; memory coupled with the processor; and instructions stored in the memory and executable by the processor to cause the apparatus to perform a method of any of aspects 1 through 8.

Aspect 18: An apparatus for wireless communications at a transmitting device, comprising at least one means for performing a method of any of aspects 1 through 8.

Aspect 19: A non-transitory computer-readable medium storing code for wireless communications at a transmitting device, the code comprising instructions executable by a processor to perform a method of any of aspects 1 through 8.

Aspect 20: An apparatus for wireless communications at a receiving device, comprising a processor; memory coupled with the processor; and instructions stored in the memory and executable by the processor to cause the apparatus to perform a method of any of aspects 9 through 16.

Aspect 21: An apparatus for wireless communications at a receiving device, comprising at least one means for performing a method of any of aspects 9 through 16.

Aspect 22: A non-transitory computer-readable medium storing code for wireless communications at a receiving device, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a transmitting device, comprising:
   one or more processors;
   memory coupled with the one or more processors; and
   instructions stored in the memory and executable by the one or more processors to cause the apparatus to:
      communicate control signal indicating an allocation of a frequency band having a first edge subband and a second edge subband;
      generate a first set of filtered data tones associated with the first edge subband and a second set of filtered data tones associated with the second edge subband using at least one subband spectrum shaping filter that is a subband based frequency domain filter; and
      transmit one or more waveforms via the frequency band based at least in part on the first set of filtered data tones and the second set of filtered data tones.

2. The apparatus of claim 1, wherein the instructions to transmit the one or more waveforms are executable by the one or more processors to cause the apparatus to:
   transmit a discrete Fourier transform spread waveform via the first edge subband and the second edge subband; and
   transmit an orthogonal frequency domain multiplexed waveform via a central subband of the frequency band.

3. The apparatus of claim 1, wherein the instructions are further executable by the one or more processors to cause the apparatus to:
   transmit, to a receiving device, an indication of one or more filters associated with the at least one subband spectrum shaping filter.

4. The apparatus of claim 1, wherein the instructions are further executable by the one or more processors to cause the apparatus to:
   transmit, to a receiving device, an indication of a bandwidth of the first edge subband, a bandwidth of the second edge subband, or both, associated with the at least one subband spectrum shaping filter.

5. The apparatus of claim 1, wherein the instructions to transmit the one or more waveforms are further executable by the one or more processors to cause the apparatus to:
   transmit the one or more waveforms according to a comb structure, wherein transmitting one or more demodulation reference signals via a demodulation reference signal symbol is based at least in part on the comb structure.

6. The apparatus of claim 1, wherein the instructions to generate the first set of filtered data tones and the second set of filtered data tones are executable by the one or more processors to cause the apparatus to:
   apply a first subband spectrum shaping filter to a first set of data tones associated with the first edge subband to generate the first set of filtered data tones; and
   apply a second subband spectrum shaping filter to a second set of data tones associated with the second edge subband to generate the second set of filtered data tones.

7. The apparatus of claim 6, wherein the instructions are further executable by the one or more processors to cause the apparatus to:
   apply one or more filters to a third set of data tones that are associated with one or more center subbands of the frequency band.

8. The apparatus of claim 6, wherein the instructions to apply the first subband spectrum shaping filter are executable by the one or more processors to cause the apparatus to:
   convolve the first set of data tones with the first subband spectrum shaping filter to generate the first set of filtered data tones to generate the first set of filtered data tones, and wherein applying the second subband spectrum shaping filter comprises:
   convolve the second set of data tones with the second subband spectrum shaping filter to generate the second set of filtered data tones.

9. An apparatus for wireless communications at a receiving device, comprising:
   one or more processors;
   memory coupled with the processor; and
   instructions stored in the memory and executable by the one or more processors to cause the apparatus to:
      communicate control signal indicating an allocation of a frequency band having a first edge subband and a second edge subband;
      receive one or more waveforms via the frequency band; and
      demodulate the one or more waveforms based at least in part on a first set of filtered data tones associated with the first edge subband and a second set of filtered data tones associated with the second edge subband, the first set of filtered data tones and the second set of filtered data tones corresponding to at least one subband spectrum shaping filter that is a subband based frequency domain filter.

10. The apparatus of claim 9, wherein the instructions to receive the one or more waveforms are executable by the one or more processors to cause the apparatus to:
    receive a discrete Fourier transform spread waveform via the first edge subband and the second edge subband; and
    receive an orthogonal frequency domain multiplexed waveform via a central subband of the frequency band.

11. The apparatus of claim 9, wherein the instructions are further executable by the one or more processors to cause the apparatus to:
    receive, from a transmitting device, an indication of one or more filters associated with the at least one subband spectrum shaping filter,
    wherein demodulating the one or more waveforms is based at least in part on the indication of the one or more filters.

12. The apparatus of claim 11, wherein the instructions are further executable by the one or more processors to cause the apparatus to:
    receive, from the transmitting device, an indication of a bandwidth of the first edge subband, a bandwidth of the second edge subband, or both, associated with the at least one subband spectrum shaping filter.

13. The apparatus of claim 9, wherein the instructions to transmit the one or more waveforms are further executable by the one or more processors to cause the apparatus to:
receive, from a transmitting device, the one or more waveforms according to a comb structure, wherein receiving one or more demodulation reference signals via a demodulation reference signal symbol is based at least in part on the comb structure.

14. The apparatus of claim 13, wherein the instructions are further executable by the processor to cause the one or more processors to:
estimate the at least one subband spectrum shaping filter based at least in part on the comb structure,
wherein the one or more waveforms are demodulated based at least in part on the at least one estimated subband spectrum shaping filter.

15. The apparatus of claim 9, wherein the instructions to demodulate the one or more waveforms are executable by the one or more processors to cause the apparatus to:
perform an inter-carrier interference equalization procedure on the first set of filtered data tones and the second set of filtered data tones.

16. The apparatus of claim 9, wherein the instructions to demodulate the one or more waveforms are executable by the one or more processors to cause the apparatus to:
perform a mean square estimate procedure on the first set of filtered data tones and the second set of filtered data tones.

17. A method for wireless communications at a transmitting device, comprising:
communicating control signaling indicating an allocation of a frequency band having a first edge subband and a second edge subband;
generating a first set of filtered data tones associated with the first edge subband and a second set of filtered data tones associated with the second edge subband using at least one subband spectrum shaping filter that is a subband based frequency domain filter; and
transmitting one or more waveforms via the frequency band based at least in part on the first set of filtered data tones and the second set of filtered data tones.

18. The method of claim 17, wherein transmitting the one or more waveforms comprises:
transmitting a discrete Fourier transform spread waveform via the first edge subband and the second edge subband; and
transmitting an orthogonal frequency domain multiplexed waveform via a central subband of the frequency band.

19. The method of claim 17, further comprising:
transmitting, to a receiving device, an indication of one or more filters associated with the at least one subband spectrum shaping filter.

20. The method of claim 17, further comprising:
transmitting, to a receiving device, an indication of a bandwidth of the first edge subband, a bandwidth of the second edge subband, or both, associated with the at least one subband spectrum shaping filter.

21. The method of claim 17, wherein transmitting the one or more waveforms further comprises:
transmitting the one or more waveforms according to a comb structure, wherein transmitting one or more demodulation reference signals via a demodulation reference signal symbol is based at least in part on the comb structure.

22. The method of claim 17, wherein generating the first set of filtered data tones and the second set of filtered data tones comprises:

applying a first subband spectrum shaping filter to a first set of data tones associated with the first edge subband to generate the first set of filtered data tones; and
applying a second subband spectrum shaping filter to a second set of data tones associated with the second edge subband to generate the second set of filtered data tones.

23. The method of claim 22, further comprising:
applying one or more filters to a third set of data tones that are associated with one or more center subbands of the frequency band.

24. The method of claim 22, wherein applying the first subband spectrum shaping filter comprises:
convolving the first set of data tones with the first subband spectrum shaping filter to generate the first set of filtered data tones to generate the first set of filtered data tones, and wherein applying the second subband spectrum shaping filter comprises:
convolving the second set of data tones with the second subband spectrum shaping filter to generate the second set of filtered data tones.

25. A method for wireless communications at a receiving device, comprising:
communicating control signaling indicating an allocation of a frequency band having a first edge subband and a second edge subband;
receiving one or more waveforms via the frequency band; and
demodulating the one or more waveforms based at least in part on a first set of filtered data tones associated with the first edge subband and a second set of filtered data tones associated with the second edge subband, the first set of filtered data tones and the second set of filtered data tones corresponding to at least one subband spectrum shaping filter that is a subband based frequency domain filter.

26. The method of claim 25, wherein receiving the one or more waveforms comprises:
receiving a discrete Fourier transform spread waveform via the first edge subband and the second edge subband; and
receiving an orthogonal frequency domain multiplexed waveform via a central subband of the frequency band.

27. The method of claim 25, further comprising:
receiving, from a transmitting device, an indication of one or more filters associated with the at least one subband spectrum shaping filter,
wherein the one or more waveforms are demodulated based at least in part on the indication of the one or more filters.

28. The method of claim 27, further comprising:
receiving, from the transmitting device, an indication of a bandwidth of the first edge subband, a bandwidth of the second edge subband, or both, associated with the at least one subband spectrum shaping filter.

29. The method of claim 25, wherein receiving the one or more waveforms further comprises:
receiving, from a transmitting device, the one or more waveforms according to a comb structure, wherein receiving one or more demodulation reference signals via a demodulation reference signal symbol is based at least in part on the comb structure.

30. The method of claim 29, further comprising:
estimating the at least one subband spectrum shaping filter based at least in part on the comb structure, wherein the one or more waveforms are demodulated based at least in part on the at least one estimated subband spectrum shaping filter.

\* \* \* \* \*